United States Patent [19]
Keighan et al.

[11] Patent Number: 6,161,105
[45] Date of Patent: *Dec. 12, 2000

[54] METHOD AND APPARATUS FOR MULTIDIMENSIONAL DATABASE USING BINARY HYPERSPATIAL CODE

[75] Inventors: Edric Keighan, Quebec; Panagiotis A. Vretanos, Toronto; Michael Galluchon, Quebec; Herman P. Varma, Nova Scotia, all of Canada

[73] Assignee: Oracle Corporation, Redwood Shores, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/827,987

[22] Filed: Oct. 2, 1996
(Under 37 CFR 1.47)

Related U.S. Application Data

[63] Continuation of application No. 08/342,922, Nov. 21, 1994, abandoned.

[51] Int. Cl.[7] .................................................. G06F 17/30
[52] U.S. Cl. ........................... 707/100; 707/102; 707/104
[58] Field of Search ..................................... 707/102, 104, 707/100

[56] References Cited

U.S. PATENT DOCUMENTS

| | | | |
|---|---|---|---|
| 4,555,771 | 11/1985 | Hayashi | 707/1 |
| 4,788,538 | 11/1988 | Klein et al. | 345/418 |
| 4,794,461 | 12/1988 | Roberts et al. | 358/261.3 |
| 5,257,365 | 10/1993 | Powers et al. | 707/100 |
| 5,261,032 | 11/1993 | Rocchetti et al. | 345/441 |
| 5,359,724 | 10/1994 | Erle | 707/205 |
| 5,414,780 | 5/1995 | Carnahan | 382/276 |
| 5,446,806 | 8/1995 | Ran et al. | 382/240 |
| 5,647,058 | 7/1997 | Agrawal et al. | 707/1 |
| 5,701,467 | 12/1997 | Freeston | 707/100 |

OTHER PUBLICATIONS

Varma et al., "A Data Structue for Spatio–Temporal Databases", International Hydrographic Review, Monaco, LXVII(1), Jan. 1990.

Hsieh et al., "A Conversion and Management System for Parcel Maps", IEEE Comput. Soc. Pres., Nov. 1994.

Beng Chin Ooi, Ken J. McDonnell, Ron Sacks–Davis, "Partial kd–Tree: An Indexing Mechanism for Spatial Database", Dept. of Computer Science, Monash University, Victoria Australia; Dept. of Computing, Royal Melbourne Institute of Technology, 1987.

Yutaka Oshwawa, Masao Sakauchi, "A New Tree Type Data Structure with Homogeneous Nodes Suitable for a Very Large Spatial Database", Institute of Industrial Science, University of Tokyo, 1990.

(List continued on next page.)

*Primary Examiner*—John Breene
*Assistant Examiner*—Greta L. Robinson
*Attorney, Agent, or Firm*—McDermott, Will & Emery

[57] ABSTRACT

An improved database data structure and datatype is disclosed for storing, manipulating and accessing multidimensional spatial data in a database. Binary helical hyperspatial code (HH CODE) is used to represent data of N dimensions. The binary HH CODE data structure maintains the dimensional organization of multidimensional data within the data itself. Spatial data is stored using BH code which is modeled as a N-tree structure derived using recursive decomposition. A high water mark is set as the upper limit for data volume which may be stored in any one partition. As data stored in a partition exceeds the high water mark, the data is decomposed into child partitions such that no partition data stores exceed the high water mark. If the high water mark is exceeded, additional child partitions are automatically created and the parent table is not retained. A data structure is defined which represents the partitioned tables and BH code values. Appropriate attributes are associated with each of the BH code values which may represent non-spatial data such as temperature, salinity, or cosmic ray flux. Methods and apparatus are also provided to apply teachings of binary HH CODE to line segments and topology.

69 Claims, 20 Drawing Sheets

OTHER PUBLICATIONS

Max J. Egenhoffer and Robert D. Franzosa, "Point–Set Topological Spatial Relations", Int. J. Geographical Information Systems, 1991, vol. 5, No. 2, 161–174.

"Implementation of HHCodes for use with hydrographic data", H. Iversen, Norwegian Hydrographic Service (NHS), http://www.statkart.no/nlhdb/hhimpl.htm, last updated Feb. 5, 1998.

"What are HH–codes and how can they be used to store hydrographic data?", H. Iversen, Norwegian Hydrographic Service (NHS), http://www.statkart.no/nlhdb/iveher/, last updated Jan. 19, 1998.

*Applications of Spatial Data Structures; Computer Graphics, Image Processing, and GIS*, H. Samet, University of Maryland, Addison–Wesley Publishing Company, 1990, pp. 1–15 and 174–175.

Hanan Samet, Applications of Spatial Data Structures: Computer Graphics, Image Processing, and GIS, 1990, pp. 30–41 and 174–181.

FIG. 4

| DATA | | |
|---|---|---|
| DIM(1) | DIM(2) | ATTRIBUTE |
| (NUMBER) | (NUMBER) | (NUMBER) |
| 0 | 0 | 0 |
| 0 | 0 | 0 |
| 0 | 0 | 0 |

WITH BHCODE ⇒

| DATA | |
|---|---|
| INTERSECT | ATTRIBUTE |
| (BHCODE) | (NUMBER) |
| 0 | 0 |
| 0 | 0 |
| 0 | 0 |

| 0 | 1 |
|---|---|
| F | T |

LONG

FIG. 7

LAT
- T: | 10 / 2 | 11 / 3 |
- F: | 00 / 0 | 01 / 1 |

F    T
LONG

FIG. 5

| RECURSIVE DECOMPOSITION | LEVEL | $2^{(DL)}$ QUAD |
|---|---|---|
| LAT 00 LONG | 0 | 1 |
| 10  11  00  01 | 1 | 4 |
| 10  11  00  01 | 2 | 16 |

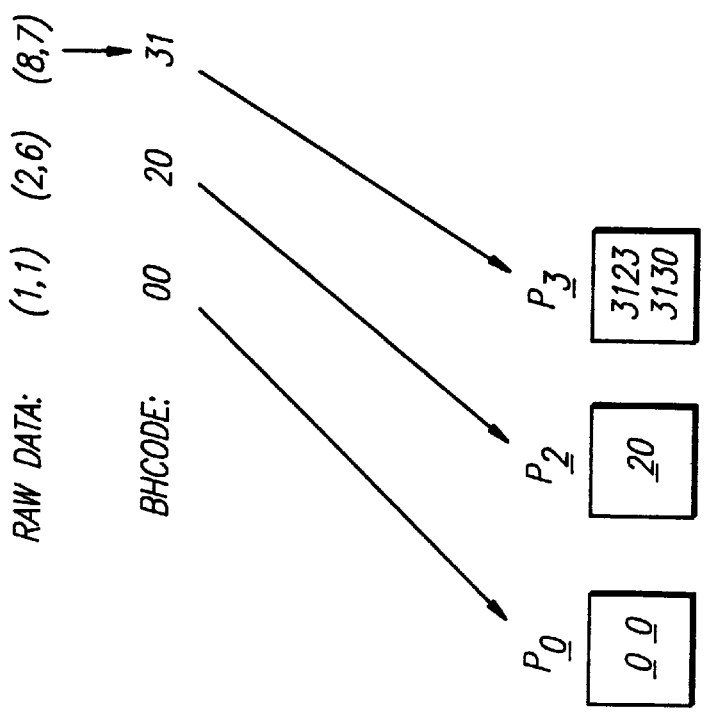
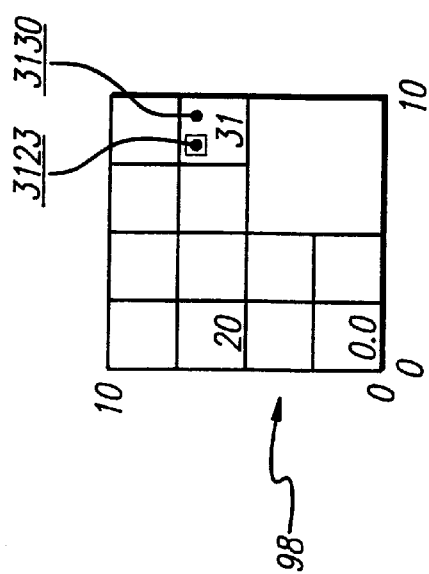
FIG. 9

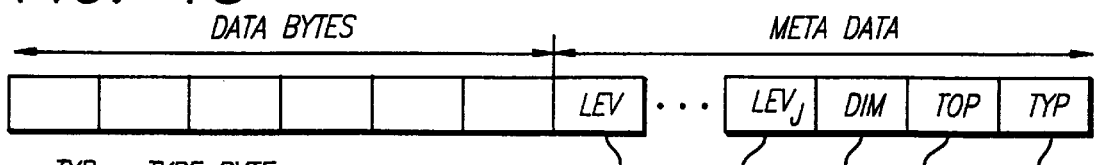

FIG. 15    BHCODE DATA STRUCTURE

TYP = TYPE BYTE
TOP = TOPOLOGY BYTE
DIM = NUMBER OF DIMENSIONS IN THE BHCODE
LEV = NUMBER OF LEVELS ENCODED FOR EACH DIMENSION

NOTES: —BHCODE BITS ARE PACKED AS TIGHTLY AS POSSIBLE INTO DATA BYTES
       —META DATA IS AT THE END SO THAT SORT ORDER IS PRESERVED

EXAMPLE: 3-D, 4 LEVEL BHCODE
         010 111 101 001 | 3 3 4 3 0 0

KERNEL FUNCTIONS: BHENCODE(),BHDECODE()
                  BHCOMPOSE(),BHCOLLAPSE(),
                  BHMATCH(),BHCOMMONCODE(),
                  BHNDIM(),BHLENGTH(),BHPRECISION(),
                  BHLEVELS(),BHCELLSIZE(),BHSUBSTR(),
                  BHDISTANCE(),BHJLDATE(),BHCLDATE()

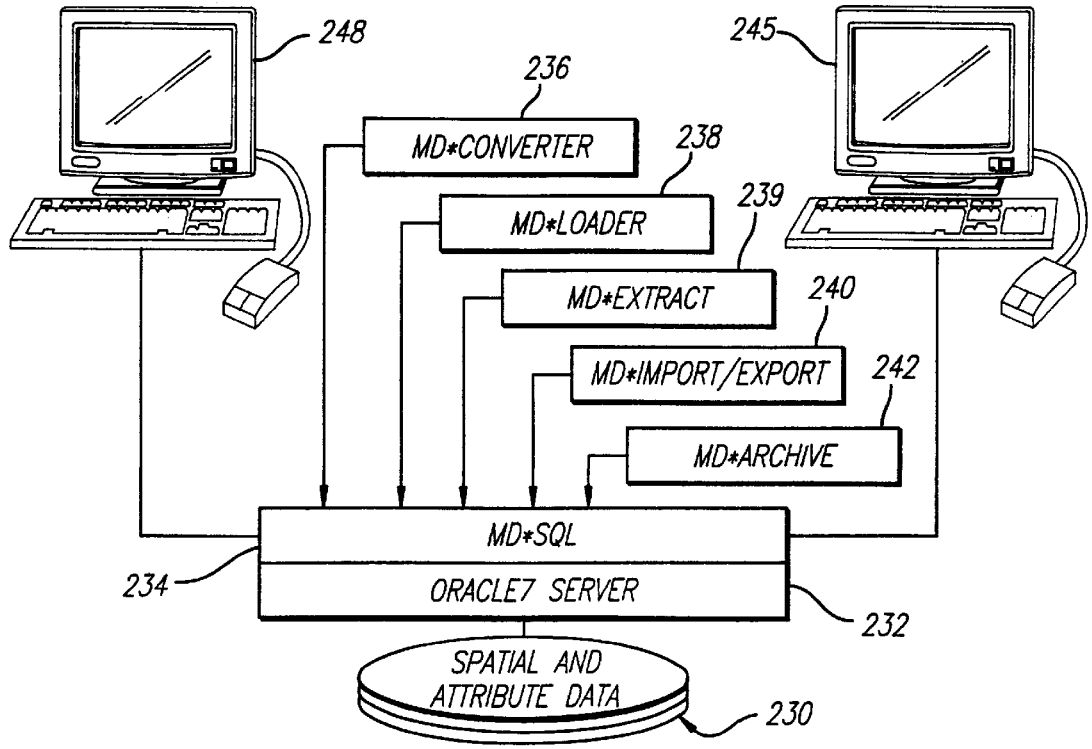

FIG. 16

FIG. 20a
FIG. 20b
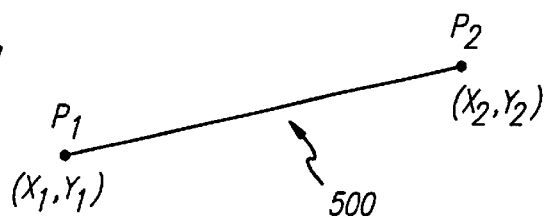
FIG. 21a
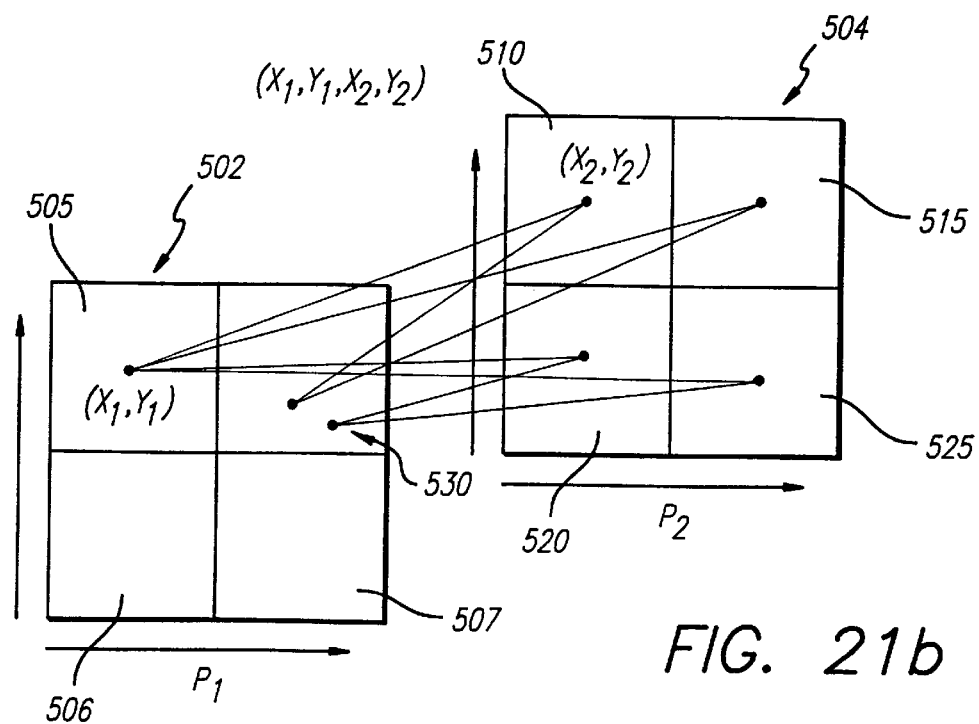
FIG. 21b $B1 \cap B3$
$I1 \emptyset I3$ } = TOUCH $B1 \cap B2$
$I1 \cap I2$ } => OVERLAP TWO OBJECTS : a,b

|  | $I_a \cap I_b$ | $B_a \cap B_b$ | $I_a \cap B_b$ | $I_b \cap B_a$ |
|---|---|---|---|---|
| DISJOINT | 0 | 0 | 0 | 0 |
| OVERLAP | 1 | 1 | 0 | 0 |
| TOUCH | 0 | 1 | 0 | 0 |

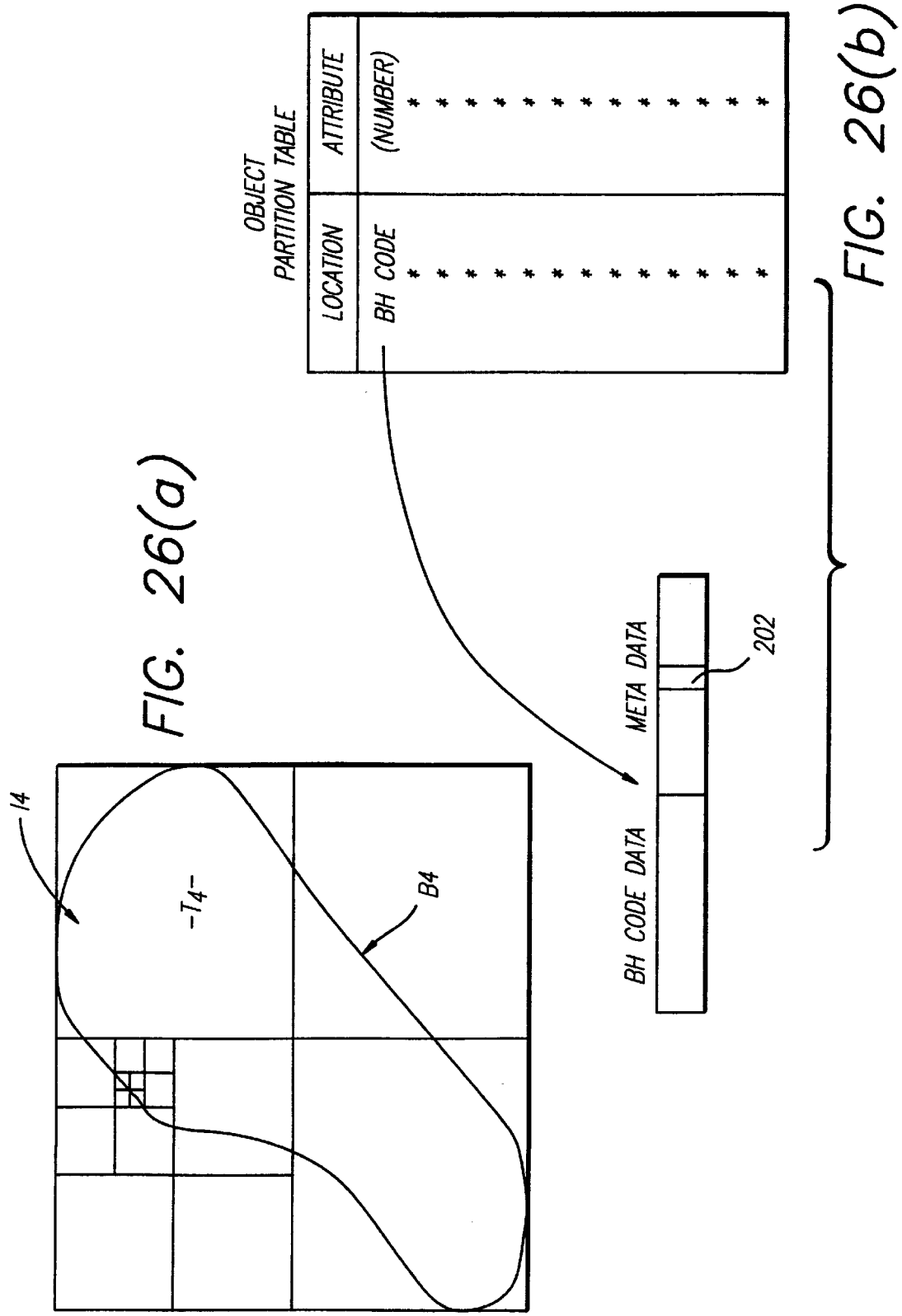

METHOD AND APPARATUS FOR MULTIDIMENSIONAL DATABASE USING BINARY HYPERSPATIAL CODE

This application is a continuation of Ser. No. 08/342,922, filed Nov. 21, 1994, now abandoned.

BACKGROUND OF THE INVENTION

1. Field of the Invention

The present invention relates to methods and apparatus for storing and manipulating multidimensional data, and more particularly, the present invention relates to database structures and methods wherein spatial data is managed within the framework of a relational database system.

2. Art Background

The position of a single point in space may be defined by multiple values. This "multidimensional data" may represent georeferenced data from hydrologic or geologic surveys, space based data collected from orbital or interplanetary spacecraft, data utilized by computer aided design (CAD) systems as well as multidimensional business data such as data required for decision support systems or on-line analytical processing systems. Depending on the environment, the data may have a high or low relative spatial content. For example, hydrographic or cartographic data is almost exclusively spatial because each record includes latitude, longitude, elevation/depth, and occasionally time as a measurement. In other instances, the spatial content may be relatively low, for example, in a customer information database where a location in the database may relate to one of many possible bits of data pertaining to a customer.

The storage and manipulation of spatial data in a traditional relational database management system presents a variety of problems. Since the relational database management system ("RDBMS") is unidimensional, each value relating to a multidimensional point must be maintained in a separate column within the database. By maintaining each value in a separate column, the organization of the spatial data is not maintained. In addition, searching for data points in a given multidimensional space requires a significant amount of computation using a relational database structure. In the case of very large relational databases used to store spatial data, the column by column range search required to locate and manipulate spatial data is computationally intensive and relatively slow.

Attempts to resolve the problem of storing and managing spatial data in relational database systems have resulted in hybrid solutions. From the perspective of the relational database model, the use of relational database systems for spatial data is inefficient. As shown in FIG. 1, one hybrid approach includes two side-by-side database engines, namely, a relational database management system 50 and a spatial database system 55. The RDBMS 50 maintains attribute data which is non-spatial. An example of attribute data is the value of temperature or ocean salinity for a three dimensional point in the Pacific Ocean. Another example of non-spatial attribute data is the cosmic ray flux through a point in space between the Earth and Mars. As illustrated in FIG. 1, the RDBMS 50 is linked to a spatial database 55 which references or links the corresponding spatial data through spatial indexes 57. One example of an existing hybrid system is a RDBMS manufactured by Oracle Corporation linked to a spatial database referred to as ARC/Info. The Oracle-ARC/Info hybrid database is used to store and manage cartographic projections and similar spatial data in conjunction with attributes related to the spatial data.

A primary disadvantage of the hybrid approach illustrated in FIG. 1 is the requirement of maintaining two discrete database engines as well as a proprietary data structure utilizing unique spatial indexes. Accordingly, the hybrid system does not provide an open distributed database architecture which is easily transportable from one hybrid application to another. In addition, as the size of the database increases, so does the size and complexity of the index. Eventually, the computational "overhead" of maintaining this index results in rapidly deteriorating performance when loading new data and updating existing database records.

The hybrid approach illustrated in FIG. 1 has been applied to geographic information systems ("GIS") which have been created to manipulate spatial objects using a limited two dimensional implementation. Several such hybrid systems exist, each with its own unique proprietary techniques for defining and manipulating spatial data. It is therefore difficult for the user of one system to access data in another because format for data storage is incompatible. This has lead to the development of "exchange" standards that define a "standard data format" which enables reading of data created in one system by another when it passes through this intermediate translation into/out of an exchange format. The result is a "spaghetti net" data infrastructure of proprietary data formats that exchange data with other systems via cumbersome translation to and from exchange formats.

The present invention provides an improved method and apparatus for storing, manipulating, and retrieving spatial and non-spatial data in a database. The present invention includes an improvement to a data structure referred to as hydrographic hyperspatial code ("HH Code"). The basic HH Code data structure was originally disclosed by H. P. Varma in a paper entitled "A Structure for Spatial-Temporal Databases", International Hydrographic Review, Monaco LXVII (1) (January, 1990) (hereinafter the "Varma paper"). HH Code as taught by Varma is a data structure which is based on a linearization technique which maintains the dimensional organization of multidimensional data within the data itself, thereby providing significant advantages over either the hybrid or traditional RDBMS data structures.

As will be described, the present invention is an improvement to the original HH Code data structure disclosed in the Varma paper. The present invention's implementation and utilization of binary hyperspatial ("BH code") overcomes the inherent limitations of prior art RDBMS in efficiently storing, manipulating and retrieving spatial data. The present invention's database method and apparatus provides for the seamless handling of both spatial and non-spatial data in the same database, and constitutes a fundamental improvement in the field of database structures and management.

SUMMARY OF THE INVENTION

The present invention discloses an improved multidimensional database wherein spatial data is managed within the framework of a relational database system. The present invention utilizes binary hyperspatial code (BH code) which is modeled as an N-dimensional tree structure, and is derived using a recursive decomposition technique. A universe of data is recursively decomposed to achieve a desired level of resolution which corresponds to the decimal precision of data. A point is conceived as residing in a region, which in the case of three dimensions results in the region having the shape of a cube. N dimensions may be represented using the present invention's binary BH code data structure. The BH code data structure of the present invention linearizes multiple dimensions into a single BH code value. The present invention's use of BH code maintains the spatial organization of the data as well as each dimension, thereby composing the BH code into a single linearized data structure. Each of the BH code values may have up to M attributes which relate to the BH code data. These attributes are user defined and correspond to physical characteristics such as temperature, cosmic ray flux, salinity and the like, or may correspond to non-physical data such as money, interest, customer names and lists, etc. Spatial data maintained using the binary BH code data structure maintains the spatial organization of the data independent of a formal index. A multidimensional table is a logical table referred to as a partitioned table which is comprised of one or more partitions or tables. Each partition represents a unique bounded N dimensional space, wherein all data in one partition exists within the same bounded region of space.

An automatic table partitioning scheme includes a high water mark which is set for the entire multidimension table, such that if the high water mark is exceeded, a set of child partitions are automatically created from the parent and the parent is then deleted. The high water mark represents the maximum data volume which may be stored in any one partition. Using the automatic data partitioning scheme of the present invention, data points which are clustered in space are disposed within the same partition. Each partition represents a different spatial region, and the spatial characteristics of the data are retained. Multidimension data partitions are created at loading time based upon the number of dimensions defined for a BH code data structure, and the high water mark which define the data volume per partition. Thus, the database of the present invention includes a plurality of partitions having entries of BH code and their respective attributes never exceeding the high water mark.

A data dictionary is created which facilitates loading and access of data into and out of the database. The data dictionary includes a table which contains a list of all partitions stored in a corresponding relational database engine which are considered to be multidimensional. The relational database stores a list of both spatial and non-spatial data. The data dictionary includes two classes of tables, namely, partitioned and non-partitioned multidimension tables. Non-partitioned multidimension tables are standard relational database tables which have one or more spatial columns. Partitioned tables are multidimensional tables that also have one or more spatial columns but that are partitioned based on one spatial column. A partitioned multidimension table is comprised of a series of partitions which are decomposed into child partitions using the present invention's automatic data partitioning scheme. Each entry in the data dictionary includes among other things, an object number, a partition name and the multidimensional extent of each partition using BH code values. Methods are disclosed for accessing data disposed within a multidimensional window defined by a user.

The present invention further provides methods for the utilization of binary BH code to represent, store, manipulate and access two dimensional lines and topology data. In the case of lines, a line segment is represented as a four dimensional BH code value. The loading of a line segment into the database of the present invention is analogous to the operation for the loading of point data or region data. The lines are loaded into the database using a distinct multidimensional table. A high water mark is set, such that child partitions are automatically created using the present invention's automatic data partitioning scheme. A method for accessing line data stored in the database is further provided which includes the definition of partition shapes to which a line may correspond. A partition list is created and the partition shapes are decoded. A determination is made as to whether or not the partition shapes overlap regions defined by the user. A list of partitions which overlap are then compiled and data records that are within the defined region are determined. Those records defined by BH code values disposed within the user defined region are reported to the user. Methods are also disclosed herein for management of more complex spatial objects representing topology.

BRIEF DESCRIPTION OF THE DRAWINGS

FIG. 4 conceptually illustrates the present invention's use of BH Code in conjunction with attributes.

FIG. 5 illustrates the present invention's use of recursive decomposition at higher levels to achieve greater resolution.

FIG. 6 illustrates a one dimensional example of the present invention's use of BH Code.

FIG. 7 illustrates the present invention's use of BH Code in two dimensions.

FIG. 9 illustrates the conversion of raw data into BH Code in accordance with the teachings of the present invention.

FIG. 15 illustrates the present invention's BH code data structure as well as kernel functions available in the presently preferred embodiment.

FIG. 16 illustrates in block diagram form the implementation of the present invention using a computer system similar to that illustrated in FIG. 2.

FIGS. 20(a) and 20(b) illustrate the present invention's use of BH code to define a line segment.

FIGS. 21(a) and 21(b) conceptually illustrate the present invention's generation of sixteen partition shapes in the case of a line segment.

FIG. 23 illustrates a region in which line segments partially or fully pass through.

FIGS. 26(a) and 26(b) conceptually illustrate the present invention's implementation of BH code to represent and operate upon topology.

Notation and Nomenclature

Figure 1:
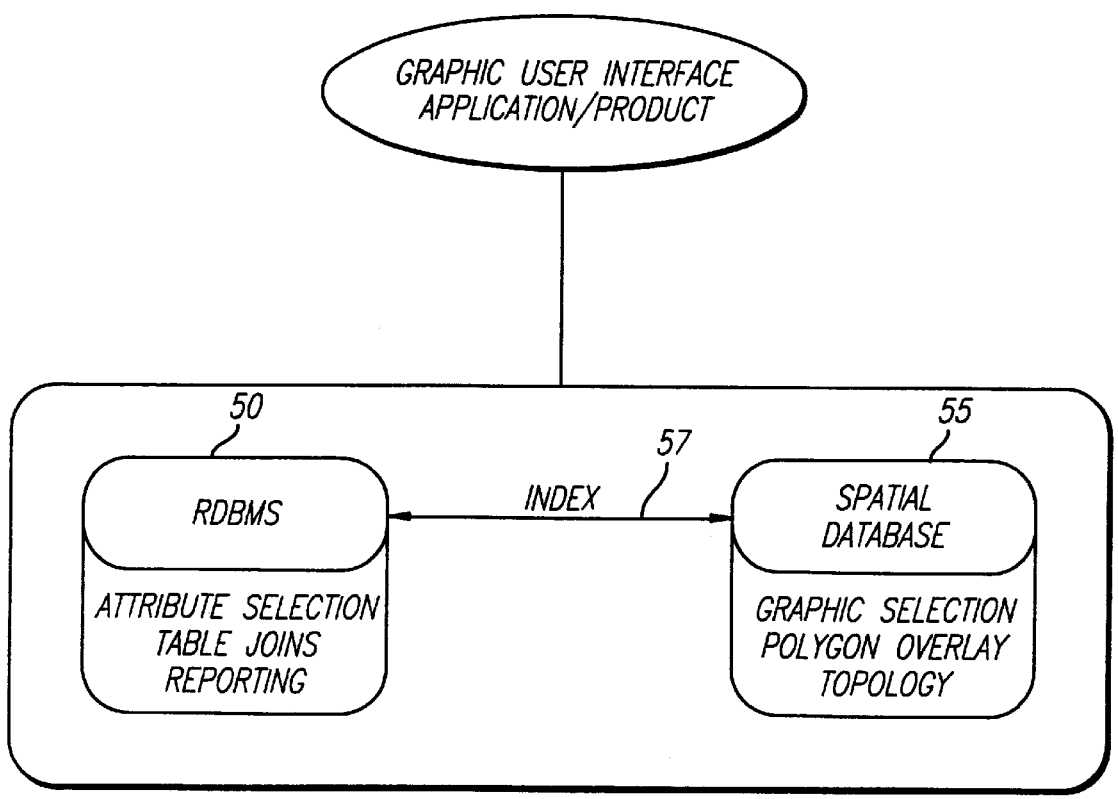
FIG. 1 illustrates a prior art hybrid system in which a relational database management system and a spatial database are interconnected through indexes.

The detailed description which follows is presented largely in terms of algorithms and symbolic representations of operations on data bits within a computer memory. These algorithmic descriptions and representations are the means used by those skilled in data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, memory cells, display elements, or the like. It should be kept in mind, however, that all of these and similar terms are to be associated with the appropriate physical quantities and are merely convenient labels applied to these quantities.

Further, the manipulations performed are often referred to in terms, such as adding, comparing, coding or decoding, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, the distinction between the method operations in operating a computer and the method of computation itself should be noted. The present invention relates to method steps for operating a computer and processing electrical or other physical signals to generate other desired physical signals.

The present invention also relates to apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus. In particular, various general purpose machines may be used with the teaching herein, or it may prove more convenient to construct more specialized apparatus to perform the required method steps. The required structure for a variety of these machines will be apparent from the description given below.

Coding Details

No particular programming language has been indicated for carrying out the various procedures described herein. This is in part due to the fact that not all languages that might be mentioned are universally available. Each user of a particular computer will be aware of a language which is most suitable for his immediate purposes. Because the computers which may be used in practicing the instant invention consist of many diverse elements, no detailed program listing has been provided. It is considered that the operations and other procedures described herein and illustrated in the accompanying drawings are sufficiently disclosed to permit one of ordinary skill to practice the instant invention, or so much of it as is of use to him.

DETAILED DESCRIPTION OF THE INVENTION

The following detailed description is divided into several sections. The first of these discloses a general system arrangement for storing, retrieving and manipulating spatial and non-spatial data using the present invention's database structure. This first section also describes the present invention's implementation of a binary BH code data structure. Subsequent sections disclose apparatus and methods for data partitioning and data access and loading utilizing the present invention's implementation of BH code. Additional sections further disclose the present invention's use of the BH code data structure for topology driven systems such as three dimensional cartography.

In the following description, numerous details are set forth such as algorithmic conventions, specific memory cells, collections of cells, attributes, dimensions and data structures, etc, to provide a thorough understanding of the present invention. However, it will be apparent to one skilled in the art that the present invention may be practiced without these specific details. In other instances, well known circuits, structures, and electronic components are not described in detail in order not to obscure the present invention unnecessarily.

General System Configuration

Figure 2:
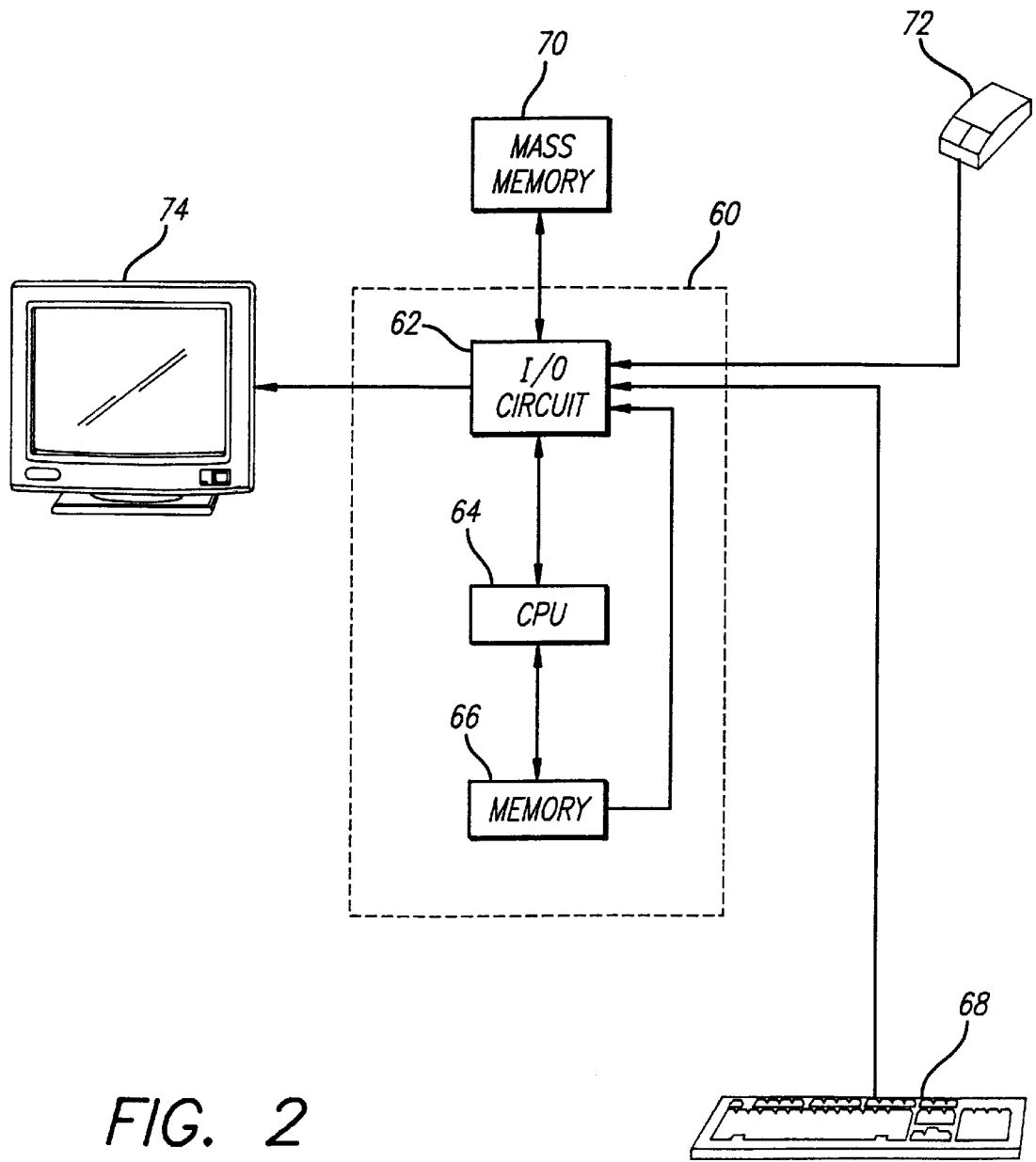
FIG. 2 illustrates one possible computer system incorporating the teachings of the present invention.

FIG. 2 illustrates a typical computer based system for implementing the present invention. Shown there is a computer 60 which comprises three major components. The first of these is the input/output (I/O) circuit 62 which is used to communicate information in appropriately structured form to and from the other parts of computer 60. Also shown as part of computer 60 is the central processing unit (CPU) 64 and memory. These latter two elements are those typically found in most general purpose computers and almost all special purpose computers. In fact, the several elements contained within computer 60 are intended to be representative of this broad category of data processors. Particular examples of suitable data processors to fill the role of computer 60 include machines manufactured Sun Microsystems, Inc, and Silicon Graphics, both located in California. Other computers having like capabilities may be utilized in a straight forward manner to perform the several functions described below.

Also shown in FIG. 2 is an input device 68 shown in a typical embodiment as a keyboard. It should be understood, however, that the input device may actually be a card reader, magnetic tape reader, or other well-known input device (including of course, another computer). A mass memory device 70 coupled to the I/O circuit 62. The mass memory 70 may be used to store all or a portion of the computer program implementing the present invention and other programs, and may take form of a hard disk drive, laser disk, or other well known mass storage device. It will be appreciated that the data retained within mass memory 70, may, in appropriate cases, be incorporated in standard fashion into computer 60 as part of the memory 66.

In addition, a "mouse" input device 72 is illustrated which permits the user to input graphic information to computer 60 through I/O circuit 62, in a well known manner. Generally, mouse 72 provides a cursor control to identify and position a cursor on a display screen. A cathode ray tube (CRT) is illustrated which is used to display the images being generated by the present invention. Such a display monitor may take the form of any of several well known varieties of displays.

Binary Hyperspatial Code (BH Code) Data Type

The present invention utilizes an improved HH Code data structure. In the original Varma paper of January, 1990, the data structure disclosed is limited to a character based implementation, and is able to support a maximum of five dimensions. Moreover, the original data structure disclosed in the Varma paper is storage inefficient. A further disadvantage to the original Varma HH Code data structure is that it is implemented at the application level, and utilizes only a primitive data dictionary. As will be described, the present invention implements an improved binary data structure which represents the intersection of a point in multiple dimensions. A single unique BH code value retains all original data values to full precision, and maintains the spatial organization of the data without the necessity of creating and maintaining a separate index structure. In addition, as will be described, the present invention's improved BH code data structure permits the modeling of line segments and the handling of topological relationship operators.

Figure 3:
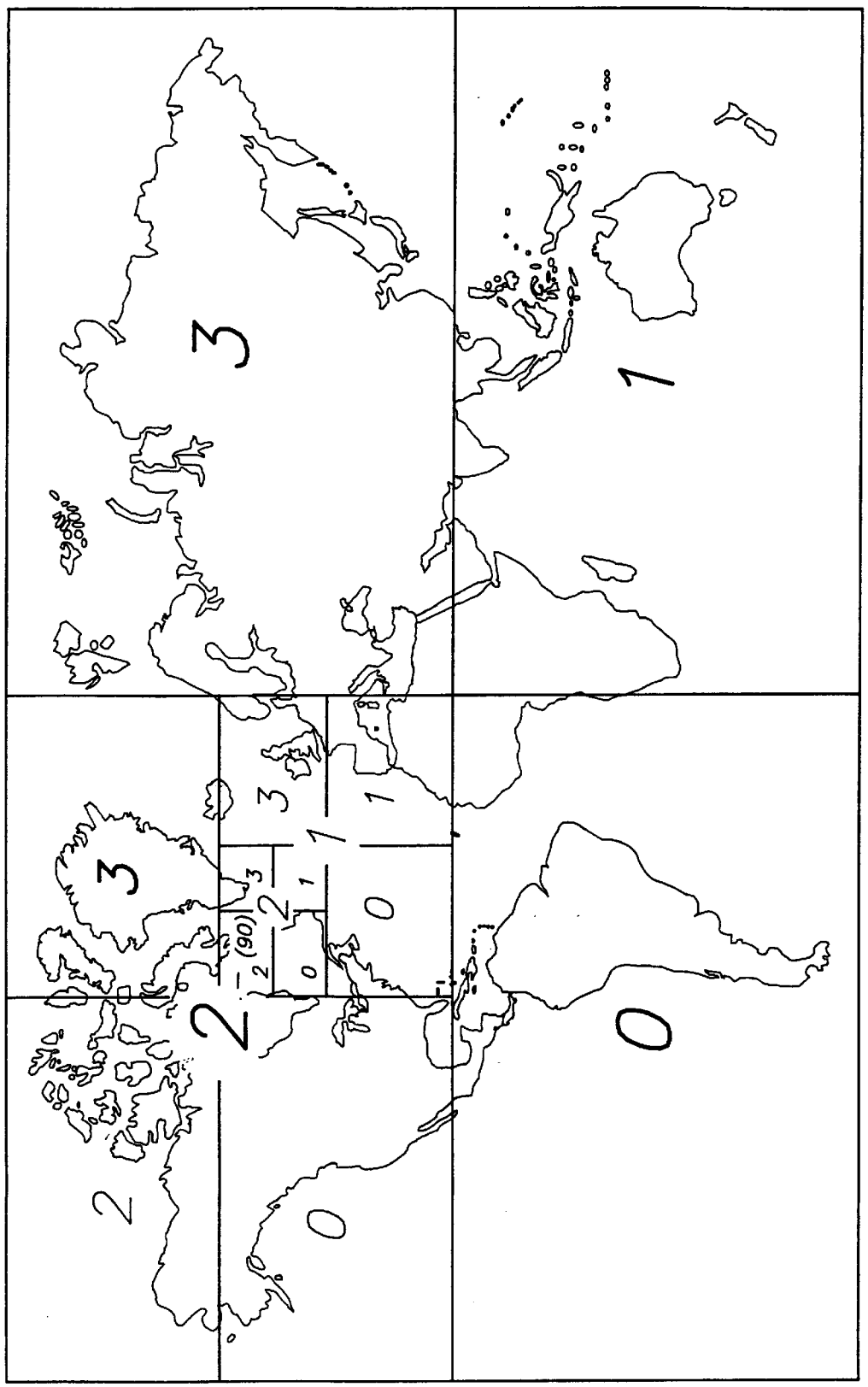
FIG. 3 illustrates the present invention's use of recursive decomposition.

Referring now to FIG. 3, the present invention's BH code data structure is modeled, in two dimensions, as a quad tree structure derived using recursive decomposition. In the example shown in FIG. 3, the world has been flattened into two dimensions wherein each area of the world may be decomposed into quadrants. At a first level, the world is divided into four quadrants (initially Quadrants 0, 1, 2 and 3). Thus, BH code may be conceived to be an orderly breakdown of object space. In the universe of data (in the example of FIG. 3, the universe comprises a world map) subdivision may be continued to a user defined level. The subdivision may be thought of in terms of resolution or precision of data. As illustrated, by zooming into a particular area (for example the area identified by the numeral 90, the area of interest, namely in the present example North America, is sequentially and recursively decomposed into quadrants (0, 1, 2, 3). A point may be conceived as eventually residing in a small region, which in the case of three dimensions results in a region having the shape of a cube or a three dimensional rectangle. Thus, depending upon the resolution desired, there is no theoretical limit to the decomposition available. As a practical matter, the level of recursive decomposition would be limited by the particular computer system utilized in which the data is stored. For geographic data, a resolution of 9.3×4.7 millimeters on the world's surface would require that a BH code data structure recursively decompose to level 32.

Referring now to FIG. 4, utilizing a standard relational database model (referred to by the numeral 92) multidimension data is typically maintained in separate columns referred to in the figure as DIM (1) and DIM (2), along with one or more attributes (for example temperature, salinity, energy, etc.). Utilizing the teachings of the present invention's binary BH code, DIM (1) and DIM (2) are maintained as a single element in the form of BH code which represents the intersection of those two dimensions. It will be appreciated that as the number of dimensions increases, the complexity of Table 92 using a traditional RDBMS also increases. However, even for N dimensions, the present invention's binary BH code representation of the multiple dimension data does not add columns to the database, and maintains all of the dimensional information in the form of a single BH code entry. As will be described, BH code in effect becomes a hyperspatial key with attributes. In this Specification, multidimensions may be defined as a number of independent vectors. An example of a zero dimensional space is a point. A one-dimensional space may be a line or the border of a circle. A two-dimensional space may be open and closed disks and their topological images. An important property of N dimensional space is that it may embed elements of N dimensions. An object has the same dimension N as its encoding space if the objects exists in that space. BH code linearizes multiple dimensions into a single BH code number.

Referring now to FIG. 5, the recursive decomposition process of the present invention is illustrated in additional detail. As shown, a universe of data is defined in the area identified as "00". At level 1, area "00" is decomposed into four subareas "00", "01", "10" and "11". If additional resolution is required in, for example, area "01", then the area "01" is further decomposed into level 2 comprising "0100", "0101", "0110" and "0111".

Figure 8:
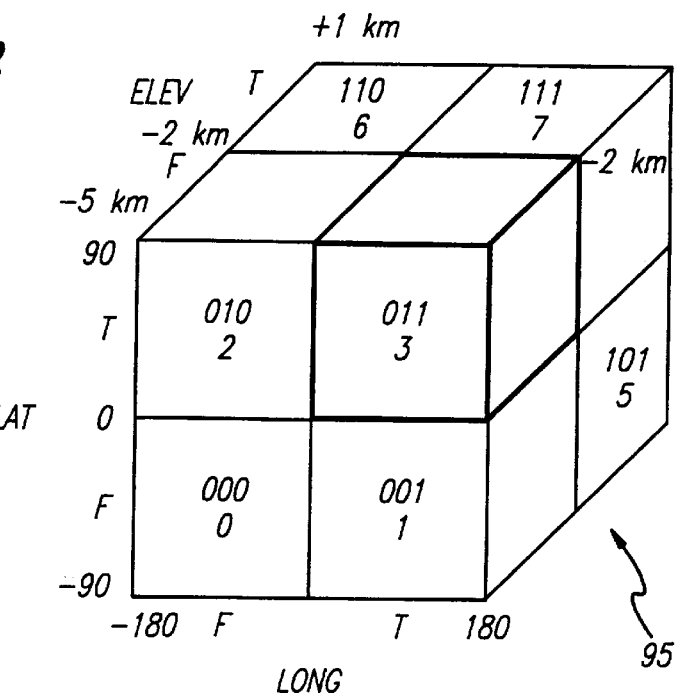
FIG. 8 illustrates the present invention's use of BH Code in three dimensions.

Referring now to FIG. 6, BH code encoding comprises a binary structure which for one-dimension may refer to longitude. BH code represents a binary decomposition for each dimension which represents either a "true" or "false" statement. As illustrated in FIG. 7, if latitude is added in addition to longitude then the latitude dimension is subdivided wherein two bits are used to represent the two dimensions in the latitudes/longitude grid. The intersection of longitude and latitude in the lower left quadrant results in "00" whereas in the upper right quadrant the intersection is represented by "11". Referring now to FIG. 8, if a third dimension is added such as elevation, three bits are used to represent each of the cubic regions comprising the cube generally referred to by the region 95. It will be appreciated by one skilled in the art that each of the three bits represents a single value, wherein the intersection of the three bits uniquely identifies three dimensional space disposed within, and forming a part of, the larger cubic region 95. For example, the cubic space having a binary BH code of 011 is shown in bold and identified by the number 3 in the figure. It will further be appreciated that the binary BH code corresponds to the numbering of the sub-cubes within the larger cubic region 95. The binary number 111 corresponds to cube 7 in cubic region 95. In the example illustrated in FIG. 8, longitude ranges from −180° to +180°, latitude ranges from −90° to +90°, and elevation ranges from −5 km to +1 km. The BH code 011 identifying, for example, cube "3" in FIG. 8 represents a volume of space between latitude 0–90° longitude 0–180°, and between elevations −5 km to −2 km.

It will be appreciated by one skilled in the art, that the use of binary BH code preserves the spatial organization of the data as well as the data itself. Using the example illustrated in FIG. 8, cosmic ray density may be measured with a resolution defined by the dimensions of each of the cubes within the cubic region 95. The cube having an BH code of 011 represents a volume of space. For finer resolution, the present invention's use of recursive decomposition is utilized such that each of the cubes are in turn decomposed into eight additional three-dimensional cubic regions within, for example, the cube 011. Although the present invention is described with reference to the figures in three dimensions, it will be appreciated that the present invention may be utilized in N dimensions. It must also be recalled that BH codes identify the location of a point in N dimensional space. As shown in FIG. 4, each of the BH codes has up to M attributes which relate to the point (or more accurately, the region) in space identified by the BH code. These attributes are user defined, and may correspond to physical characteristics. For example, attributes may comprise measurements for temperature, salinity, cosmic ray flux and the like, or may correspond to non-physical data such as money, interest, customer names and lists, etc. Thus, the BH code represents a region, which depending on the resolution desired, may be a range from microscopic to macroscopic in size. In addition, BH coding as taught by the present invention is a bit based data structure and is not limited by the character based implementation initially disclosed in the Varma paper. In addition, the Varma paper HH Code is implemented by Varma and is limited to the maximum of five dimensions. The present invention's use of BH code is not limited to characters or any set number of dimensions.

Referring now to FIG. 9, there is provided an additional example of the use of BH codes. Assume for the sake of example that raw data is provided as shown in the figure. The first step in the present invention is to determine an BH code for the data provided. The region in FIG. 9 corresponding to the raw data is generally referred to by the number 98. As illustrated, the raw data resides in three quadrants within the defined region, namely quadrants 00, 20, and 31. Partitions are generated which are identified as $P_0$, $P_2$, and $P_3$. As shown, $P_0$ includes a single entry of BH code 00, $P_2$ includes a single entry for BH code 20, and partition $P_3$ includes two entries identified as 3123 and 3130. The creation of data partitions will be described more fully below in the section entitled Data Partitioning. It will be recalled that the BH code identifies a particular region in space to which certain attributes relate. For example, the location having BH code 3130 may correspond to a region in the ocean having the attributes of temperature and salinity. It will be appreciated by one skilled in the art, that the selection of attributes and the number of attributes are a matter of design choice based upon the application in which the present invention is utilized.

Data Partitioning Using BH Code

Spatial data maintained using BH code may be viewed as N dimensional buckets which can include non-spatial data. One of the primary advantages of the present invention's binary BH code data structure is its ability to maintain the spatial organization of the data independent of a formal index data structure. In effect, a standard binary sort applied to spatial data represented using binary BH code will order this data spatially based on the number of dimensions comprising the BH code. A multidimensional table is a logical table referred to as a "partitioned table" which is comprised of one or more partitions. Each partition represents a unique bounded N dimensional space wherein all data in one partition exists within the same bounded region of space.

Figure 10:
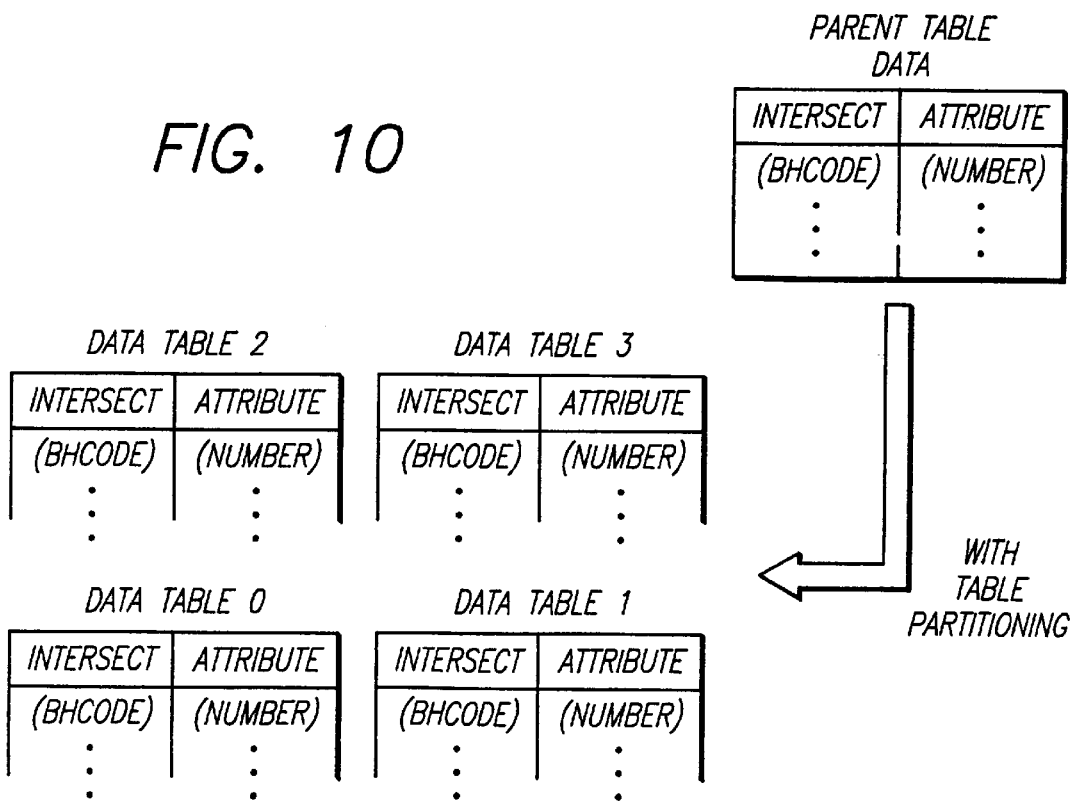
FIG. 10 illustrates the present invention's data partitioning scheme wherein a parent partition is automatically decomposed into child partitions.

The present invention's automatic data partitioning scheme is conceptually illustrated in FIG. 10. As will be described more fully below, BH code data and its corresponding attributes are stored within spatially organized partitions (referred to, at times, herein as "tables"). A "high water mark" is set for each multidimensional bucket, such that if the high water mark is exceeded then a child partition is created from the parent. The high water mark represents the maximum data volume which may be stored in any one partition corresponding to a multidimensional bucket. As conceptually illustrated in FIG. 10, as BH code and the corresponding attributes are stored in a parent partition the high water mark may be exceeded thereby resulting in the generation of data partitions 0–3. A unique feature of the present invention's data partitioning scheme is that data points which are clustered in space are disposed within the same partition. Thus, each partition represents a different spatial region and the spatial characteristics of the data are retained. As will be appreciated from the discussion which follows, the data partitioning scheme of the present invention operates identically no matter how many dimensions (0–N) are utilized. Unlike prior art RDBMS and hybrid systems which require additional indexes for each added dimension, the present invention's use of binary BH code and automatic data partitioning avoids the requirement for multiple spatial indexes.

In operation, multidimension data partitions are created at loading time based on the number of dimensions defined for an BH code datatype, and a user defined data volume per partition (the present invention's "high water mark"). For each partition created, one entry per partition is maintained in a multidimensional data dictionary which will be described in more detail below.

Figure 11:
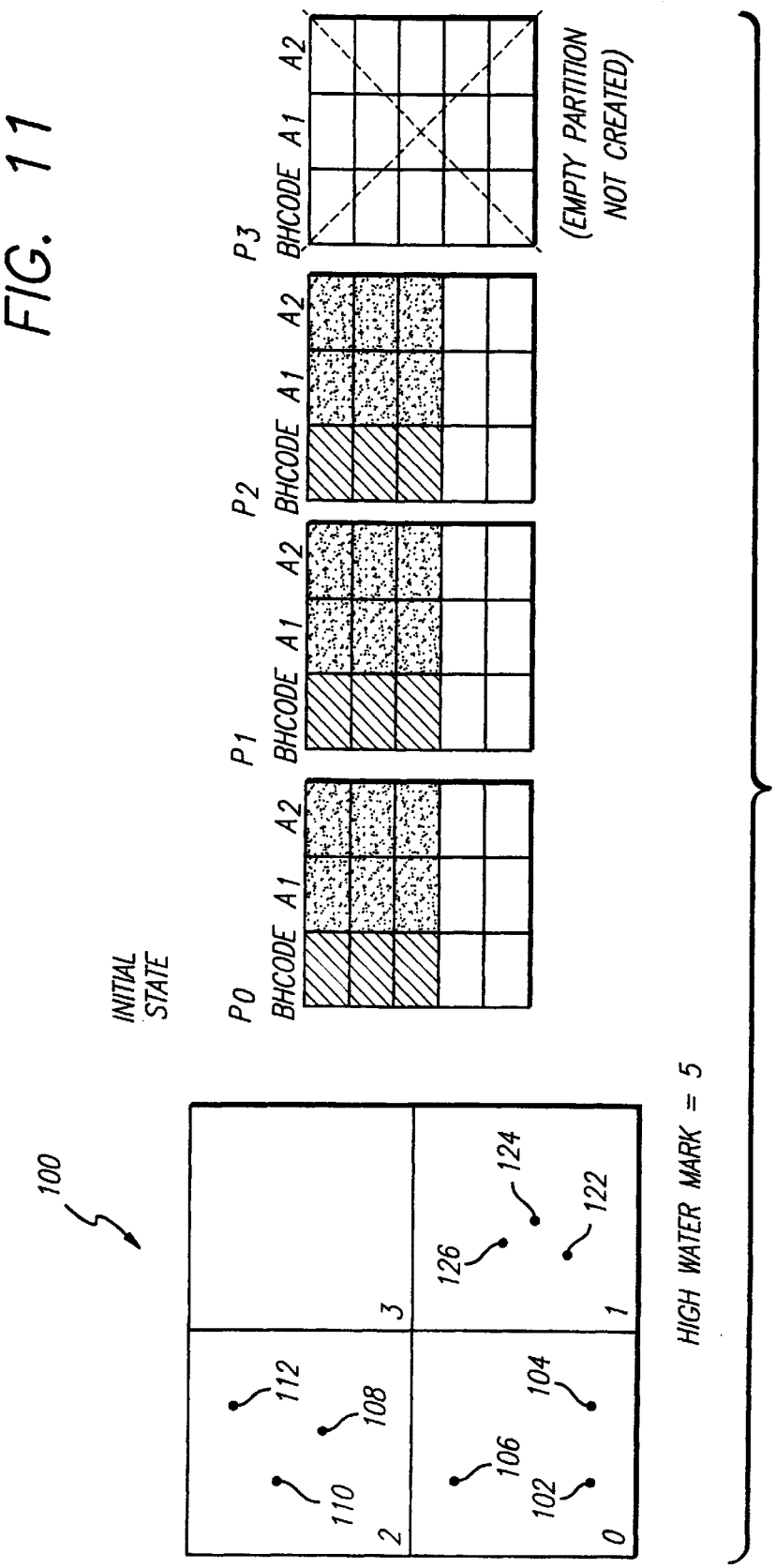
FIG. 11 diagrammatically illustrates the present invention's decomposition of a given area into two dimensional quadrants in conjunction with the creation of BH code/attribute partitions and the setting of a high water mark.

With reference now to FIG. 11, the present invention's automatic data partitioning scheme will be described in more detail. Assume for sake of example that a data universe 100 initially includes four partitions (0–3), and wherein the partitions $P_0$, $P_1$, and $P_2$ have disposed therein three data points. As illustrated, initially four partitions are created, $P_0$, $P_1$, $P_2$, and $P_3$. Each of the partitions includes a spatial column comprising the BH code for each of the points disposed within the corresponding quadrant as well as attributes columns $A_1$, $A_2$–$A_N$. For purposes of the illustration, partitions $P_0$, $P_1$, $P_2$, and $P_3$ include only two attribute columns $A_1$ and $A_2$. As previously described, these attribute columns may correspond to physical parameters such as temperature, salinity, or cosmic ray flux, or may correspond to non-physical data such as telephone numbers, customer names, and the like. As illustrated, each of the quadrants 0, 1 and 2 have therein disposed three data points. Correspondingly, each of the partitions $P_0$–$P_2$ has three entries represented in the figure as shaded and hashed portions within each table. In addition, for purposes of explanation, the high water mark is assumed to be set equal to five, thereby limiting the number of entries in each of the partitions $P_0$–$P_3$ to five. No data exists in partition $P_3$ and no memory space is wasted by maintaining this partition. However, for purposes of clarity, partition $P_3$ is shown in the figures.

As shown in FIG. 11, each of the partitions $P_0$–$P_2$ has three entries with two entries not being shaded, thereby indicating that two additional data points may be stored within each of the partitions $P_0$–$P_2$. In practice, empty partitions such as $P_3$ are not created, thereby saving storage space within the computer system illustrated in FIG. 2. However, for purposes of explanation, the unused data entries are shown to clearly describe the present invention. In addition, for purposes of illustration, points within partition $P_0$ are identified by the numerals 102, 104, and 106.

For purposes of illustration points disposed within partition $P_2$ are identified as 108, 110, and 112. Points 122, 124, and 126 are disposed within partition $P_1$. As illustrated, no data exists in partition $P_3$.

Figure 12:
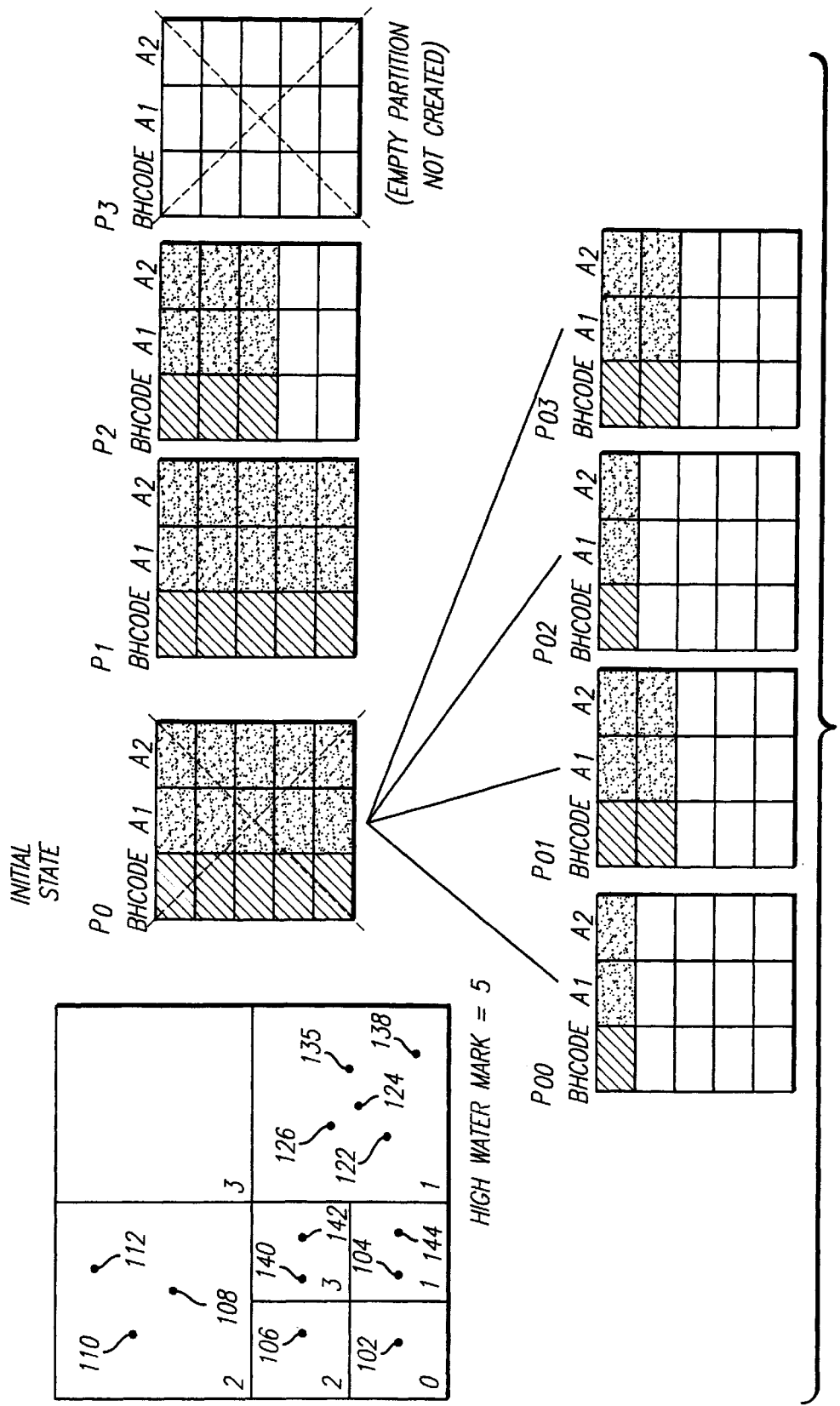
FIG. 12 diagrammatically illustrates the present invention's automatic data partitioning for the generation of child partitions, and the recursive decomposition of a two dimensional quadrant into additional quadrants where the number of data points exceeds the set high water mark.

Assume for sake of example that additional data is to be stored within the universe of data 100. For example, two additional points 135 and 138 have been added to quadrant 1, and reflected in partition $P_1$. Since the high water mark has been set to five, the addition of points 138 and 135 in quadrant 1 do not exceed the high water mark limit, and there is no change required to the corresponding partitions. However, as illustrated, the addition of points 140, 142 and 144 to quadrant 0 results in the total number of data points (six) exceeding the high water mark limit of five. In accordance with the teachings of the present invention, if the high water mark is exceeded in any one quadrant, than the quadrant is decomposed into four child partitions (in two dimensions) identified in the present example as $P_{00}$, $P_{01}$, $P_{02}$ and $P_{03}$. Also as illustrated, the parent partition $P_0$ is not retained in the database structure of the present invention. As best shown in FIG. 12, partition $P_{00}$ includes one entry corresponding to point 102. Partition $P_{01}$ includes two entries corresponding to points 104 and 144, and partition $P_{02}$ includes one entry corresponding to point 106. Similarly, partition $P_{03}$ includes two entries corresponding to points 140 and 142.

Figure 13:
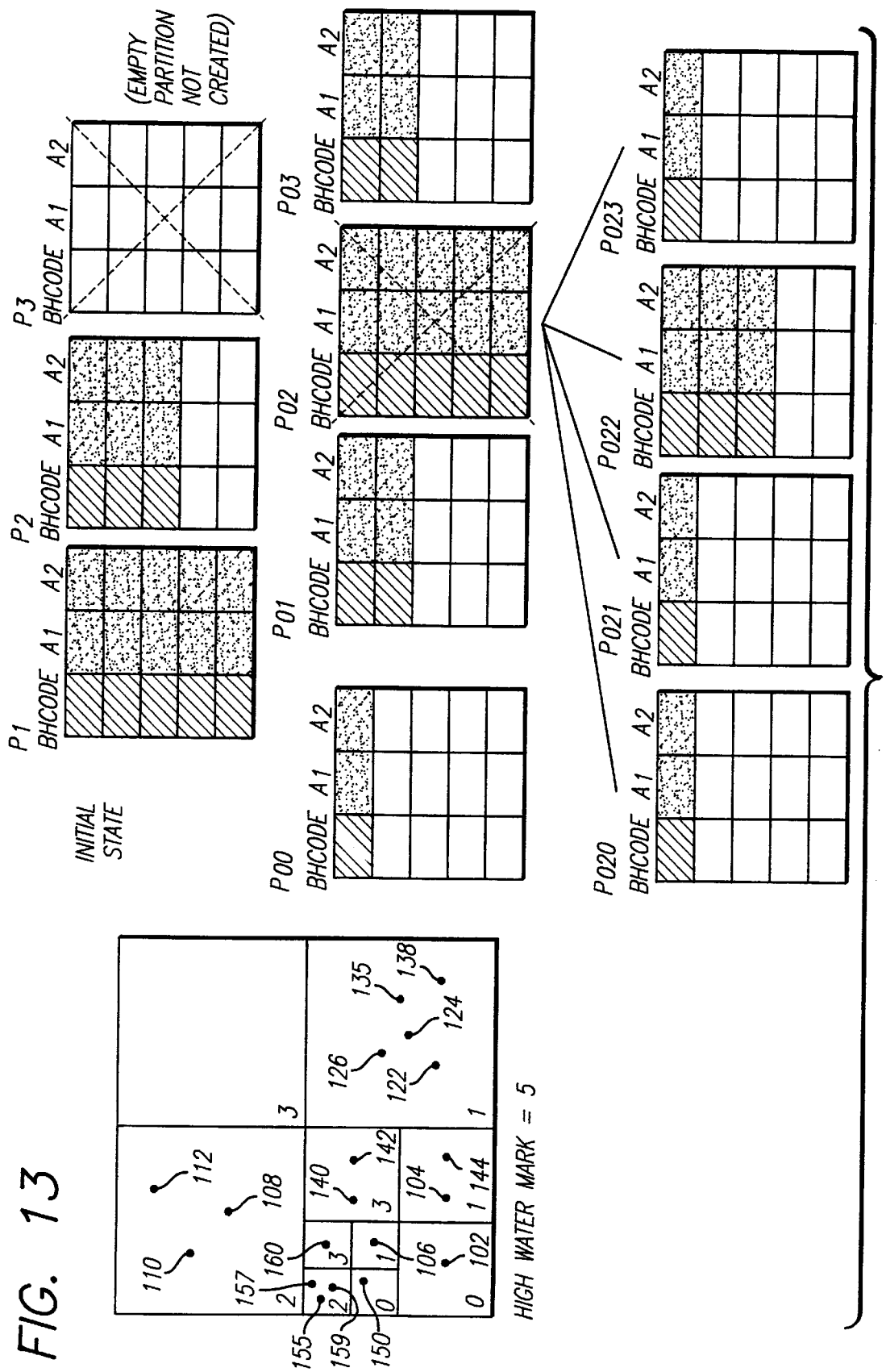
FIG. 13 diagrammatically illustrates the recursive decomposition of a two dimensional quadrant into additional quadrants, where additional two dimensional data points have been added exceeding the high water mark, and the creation of additional child partitions through the present invention's automatic data partitioning scheme.

Referring now to FIG. 13, assume for sake of example that additional data points are added to quadrant 2 represented by partition $P_{02}$. As illustrated, the addition of points 150, 155, 157, 159 and 160 results in a total of six data entries thereby exceeding the high water mark of five for any one table. Accordingly, quadrant 2 represented by partition $P_{02}$ is decomposed and partitioned into an additional four partitions $P_{020}$, $P_{021}$, $P_{022}$ and $P_{023}$, as illustrated. The contents of partition $P_{02}$ are reflected in the individual child partitions and partition $P_{02}$ is not retained in the database of the present invention. As shown, partition $P_{020}$ contains one entry for data point 150, partition $P_{021}$ includes one entry representing point 106, partition $P_{022}$ includes three entries representing points 155, 157 and 159, and partition $P_{023}$ includes one entry representing point 160.

Thus, in accordance with the present invention's automatic data partitioning scheme, the database of the present invention includes a plurality of partitions having entries of BH Code and their respective attributes never exceeding the high water mark. In addition, as illustrated in FIGS. 12 and 13, once a parent partition has created four child partitions (in two dimensions), the parent partition (for example partition $P_{02}$) is not retained.

Figure 14:
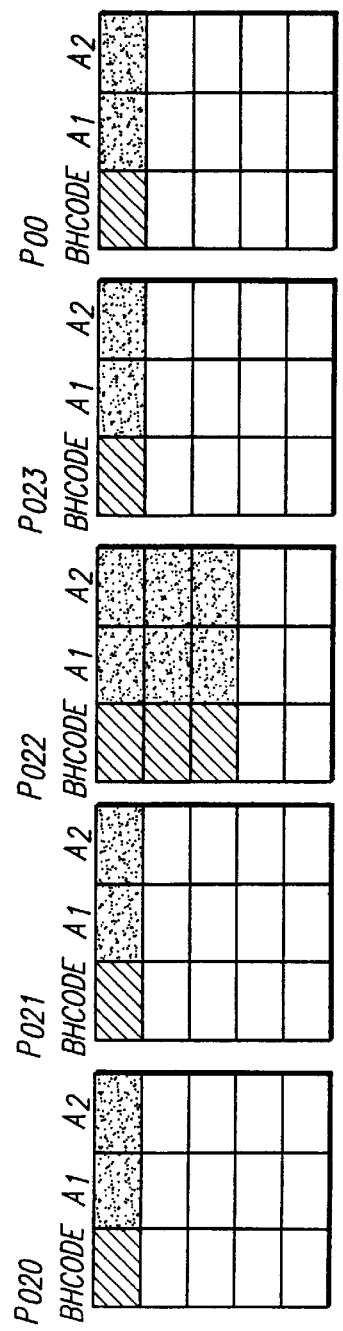
FIG. 14 diagrammatically illustrates the linear arrangement of partitions created through the processes illustrated in FIGS. 11, 12 and 13.

Referring now to FIG. 14, if all of the active partitions illustrated in FIGS. 11, 12 and 13 are disposed in a linear array they assume the configuration illustrated in FIG. 14. In accordance with the present invention, the hierarchy of the partition is not maintained, but rather, the partitions are maintained at their level of resolution in a linear manner. It will further be appreciated that by examining the length of the partition extent (BH code), the relative size and the number of recursive decompositions within a partition may be determined. Thus, partition $P_1$ represents a larger quadrant relative to partition $P_{01}$. Similarly, $P_{020}$ represents a much smaller region than partition $P_1$. As will be described with respect to the present invention's dictionary function, the partitions are maintained in a dictionary which tracks the various multidimensional information. Utilizing the present invention's data partitioning scheme, it is possible to determine for any point in time which region a particular partition covers. Thus, the automatic data partitioning scheme of the present invention significantly reduces the required time for data access. In the present implementation of the invention, the partition created through the present invention's data partitioning scheme are stored as tables in a database system, such as that manufactured by Oracle Corporation. The tables are physically written into the database as table objects.

BH Code Data Structure

Referring now to FIG. 15, the present invention's implementation of BH code as utilized by the computer system illustrated in FIG. 2 is shown. The BH code's data structure comprises a series of data bytes which represents the actual BH code data. In addition to the BH code data, a number of data bytes referred to as "meta" data also form a portion of the BH code data structure. For example, as shown the meta data includes a "type" identifier byte 200. The type identifier byte identifies whether the BH code provided in the data bytes represents point or line data. A "topology" byte 202 is utilized by the present invention in the case where topology is represented by BH code. The use of BH code for topology data is described more fully below in this Specification. A "dimension" byte 204 identifies the number of dimensions in the BH code. In addition, as illustrated a plurality of "level" bytes including level byte 208 through level byte 210 are provided. The number of levels represents the precision encoded for each dimension. It is proposed that although a number of dimensions may be represented using BH code, such as for example, latitude, longitude and depth, not all of the dimensions need to be maintained within the system at the same level of precision.

An example of three-dimensional four level BH code is also shown in FIG. 15. The first level of subdivision is represented by 010, the second level of division is represented by 111, the third level of division is represented by 101, and the fourth level of division represented by 001. The first binary quantity at each level represents the first dimension, the second binary quantity for each level represents the second dimension, and the third binary quantity for each level represents the third dimension. With reference to the example illustrated in FIG. 15, the type byte 200 is set to 0 indicating that the data represented by the binary BH code is point data. The topology byte 202 is set to 0 indicating that topology is not invoked, and the dimension byte 204 is set to value of 3 indicating that the BH code data represents three dimensions. As shown, level byte 208 is set at a precision level of 3 bits. A 3 bit precision level is interpreted by the system of the present invention such that valid bits are identified in the BH code data as 011. The 0 bit identified in FIG. 15 as bit 212 is considered a null bit since only three levels of precision have been set in the level byte 208. The level byte identified in FIG. 15 as 214, and having a value of "3" results in a three bit level precision, having the values 110 where the 0 bit identified by the numerical 216 is considered a null bit. The third dimension level bit (identified by the numerical 219) is set to a precision level of "4." Thus, the binary BH code having four bits of precision is identified as 0111.

The present invention's use of level bits to selectively set the level of precision for each dimension permits maximum optimization for data collection, retention and retrieval. In certain instances, it may be desirable to maintain each dimension at a different level of precision. For example, a three bit level of precision may be adequate for longitude and latitude, however, if a third dimension is used for time, additional precision may be required (for example counting time in the milliseconds rather than in tenths of a second).

Continuing to refer to FIG. 15, a number of kernel functions implemented in the presently preferred embodiment are illustrated. The kernel function BHENCODE is used by the present invention to create the BH code data structure illustrated in FIG. 15 from the raw BH code data. Similarly, the kernel function BHDECODE utilizes the BH code data structure illustrated in the figure to recover the original raw data. The kernel functions BHCOMPOSE and BHCOLLAPSE permit the manipulation of dimensional data within the multidimensional data structure. For example, a new two dimensional BH code data structure may be generated using the kernel function BHCOMPOSE operating on a four dimensional data structure. The kernel function BHCOLLAPSE permits the system of present invention to remove dimensions from existing BH code data structure. For example, an initially three dimensional BH code data structure may be collapsed into a two dimensional structure by the removal of one dimension using the kernel function BHCOLLAPSE.

The kernel function BHMATCH may be used by the present invention to compare two BH code structures to determine whether or not they match to a specified number of levels of precision. The kernel function BHCOMMON CODE compares two BH code data structures and derives the common characteristics of the two BH codes. It will be appreciated that by extracting the common elements between two BH code data structures it is simple to determine whether or not the two data points reside in the same spatial bucket. The kernel function BHNDIM provides as a output the number of dimensions of the BH code. The function BHLENGTH determines the level of precision for each specified dimension, or alternatively, the highest level precision for the BH code data structure on which the function BHLENGTH is directed to operate upon. The function BHPRECISION provides a decimal representation of a specified level of precision. Similarly, the function BHLEVEL returns the number of levels required for a specified level of precision. BHCELLSIZE provides the size of the boundaries of a region in which a data point resides. For example, in the case where data measurements are taken for ocean salinity at a depth of 1000 feet below a point in the ocean, as previously described in the Specification, the data point for the ocean salinity value resides in a region the size of which is a function of the measuring methods and devices used to obtain a certain resolution. The function BHCELL-SIZE identifies the size of the region in which the BH code data is disposed.

The kernel command BHSUBSTR returns the substring of a BH code which permits the user to aggregate data based on spatial information. An example of the use of the BHSUBSTR function is the determination of the average salinity value between two or more BH code data points representing measurements at different data precision. Using BHSUBSTR the user may aggregate from a maximum precision to something less depending upon the requirements of the user. The function BHDISTANCE provides a distance value between two BH code data points. In operation, BHDISTANCE determines the square of the numeric cartesian distance value between the center points of two BH code data. The functions BHJLDATE and BHCLDATE permits the user to convert measurements between Julian and calendar dates to a precision of milliseconds.

Referring now to FIG. 16, a general illustration of the present invention as implemented on a computer system, such as that shown in FIG. 2, is shown. Spatial BH code and attribute data is stored on a magnetic disk 230. A computer server 232 is coupled to the disk 230 which operates in conjunction with an SQL language program (234). As shown, various devices including a converter 236, a loader 238, an extractor 239 and an import/export handler 240 are coupled to the server 232 through the common interface of SQL. In addition, an archive program 242 is also coupled to the server 232, as shown. Moreover, it is contemplated that the system of the present invention may be coupled to other workstations providing, for example, third party applications 245 and visualization tools 248.

Data Dictionary

Figure 17:
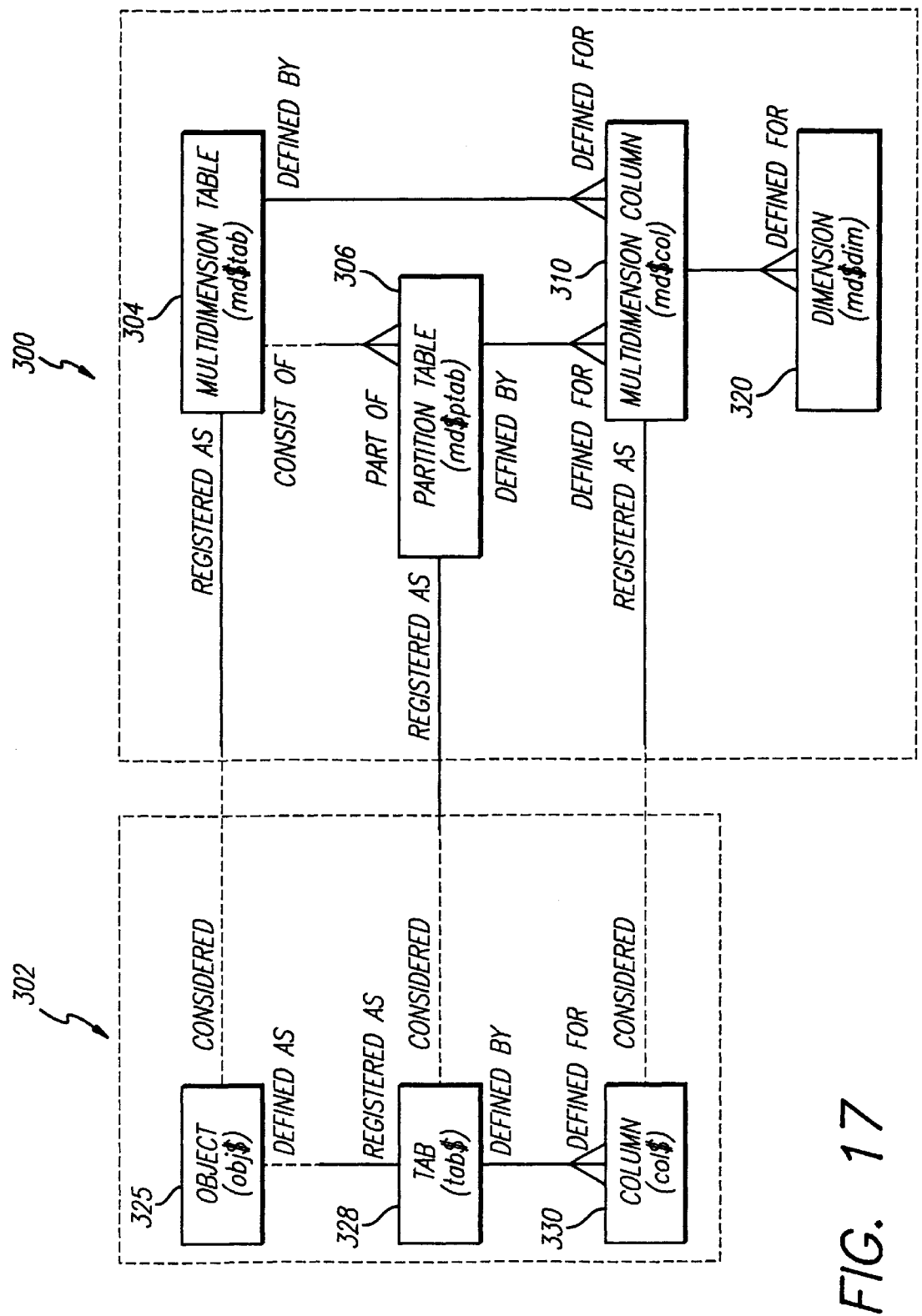
FIG. 17 is a block diagram of the present invention's data dictionary as meta data support for multidimensional data maintained in a relational database system.

The present invention's use of BH code permits the creation of a data dictionary which significantly eases both loading and access of data into and out of the database. As will be described, spatial information is maintained within the dictionary, thereby permitting efficient loading and retrieval. Referring now to FIG. 17, therein is a schematic illustration of the present invention's multidimension data dictionary referred to generally by numeral 300. In addition, FIG. 17 illustrates a portion of a database structure identified by numeral 302, which the current embodiment comprises a relational database (RDBMS) offered by Oracle Corporation.

As shown, the present invention's data dictionary 300 includes a multidimensional table 304. The multidimensional table 304 contains a list of all tables stored in the RDBMS database which are considered to be multidimensional. As previously described, the present invention has application to both spatial and non-spatial data. Of the tables stored in the RDBMS 302, the multidimension table 304 stores a list of those tables which are considered to be spatial, and therefore multidimensional.

The data dictionary 300 provides and operates upon two classes of tables, namely, partitioned multidimension tables and non-partitioned multidimension tables. A partitioned table 306 is coupled to the multidimension table 304. Non-partitioned multidimension tables are standard RDBMS tables which have one or more spatial or BH code type columns. Partitioned tables are multidimension tables that also have one or more spatial columns, but are partitioned on one of those spatial columns. In other words, the partitioned table 306 comprises a series of partitions which can be decomposed into child partitions, as previously described with regard to data partitioning. The list of multidimensioned tables stored in multidimension dictionary table 304 may consist of partitioned multidimension tables, wherein each partition must form a part of a multidimension table. A multidimension column table 310 is coupled to the partitioned table 306 and the multidimension table 304. Multidimension column table 310 maintains a list of all columns in the database that are considered to be BH code type or any other database type. As illustrated, the relationship between the multidimension column table 310 and the multidimension table 304 is that each multidimension table entry disposed within the multidimension table 304 is defined by one or more multidimension columns. The dimension table 320 comprises a table that maintains the dimensions information for each BH code column. As will be recalled, a multidimension column is a column of type BH code and that column is comprised of one or more dimensions. The dimension table 320 maintains the definitions of those dimensions, and the relationship therein which identifies that a multidimension column must be defined by one or more dimensions, and a dimension must be defined for a multidimension column.

As shown in FIG. 17, the relationship from the multidimension table 304 to multidimension column table 310 is defined by two paths. A direct path is defined from the multidimension table 304 to the multidimension column table 310, for a table that is non-partitioned. Since there are two classes of multidimension tables, namely partitioned and non-partitioned, a non-partitioned table using the teachings of the present invention may store spatial data, however, there then exists a need to maintain an identification of which columns within the non-partitioned table represent spatial data. Moreover, a multidimensional table which consists of one or more partitions may in turn consist of one or more multidimension columns.

Continuing to refer to FIG. 17, the RDBMS data dictionary 302 utilizes three tables in a standard Oracle data dictionary. The object table 325 maintains a list of all objects in the database including, without limitation, tables, views, and the like. A tab table 328 comprises a subtable of the object table 325, which stores information related to all objects which are considered to be tables. A column table 330 maintains information about all the columns that are part of the tables in tab$ which are part of the objects in the object table 325.

As shown in FIG. 17, object table 325 is linked to the multidimension table 304. The tab table 328 is linked to the partitioned table 306, and the column table 330 is linked to the multidimension column table 310. The link between the object table 325 and the multidimension table 304 reflects the convention that all multidimension tables are considered to be database objects. An object may, therefore, be considered a multidimension table. Thus, all multidimension tables are considered database objects. The Oracle dictionary provides that a table listed in the tab table 328 may be considered a partitioned table, but a partitioned table must be registered as a regular Oracle table. As illustrated, the column table 330 is linked to the multidimension column table 310. A database column which is listed in the column table 330 may be considered a multidimension column, which would be listed in the multidimension column table 310. However, a multidimension column listed in table 310 must be registered as a database column in the column table 330.

As will be described, the data dictionary 300 permits efficient data access for multidimension data stored in accordance with the teachings of the present invention.

Figure 18:
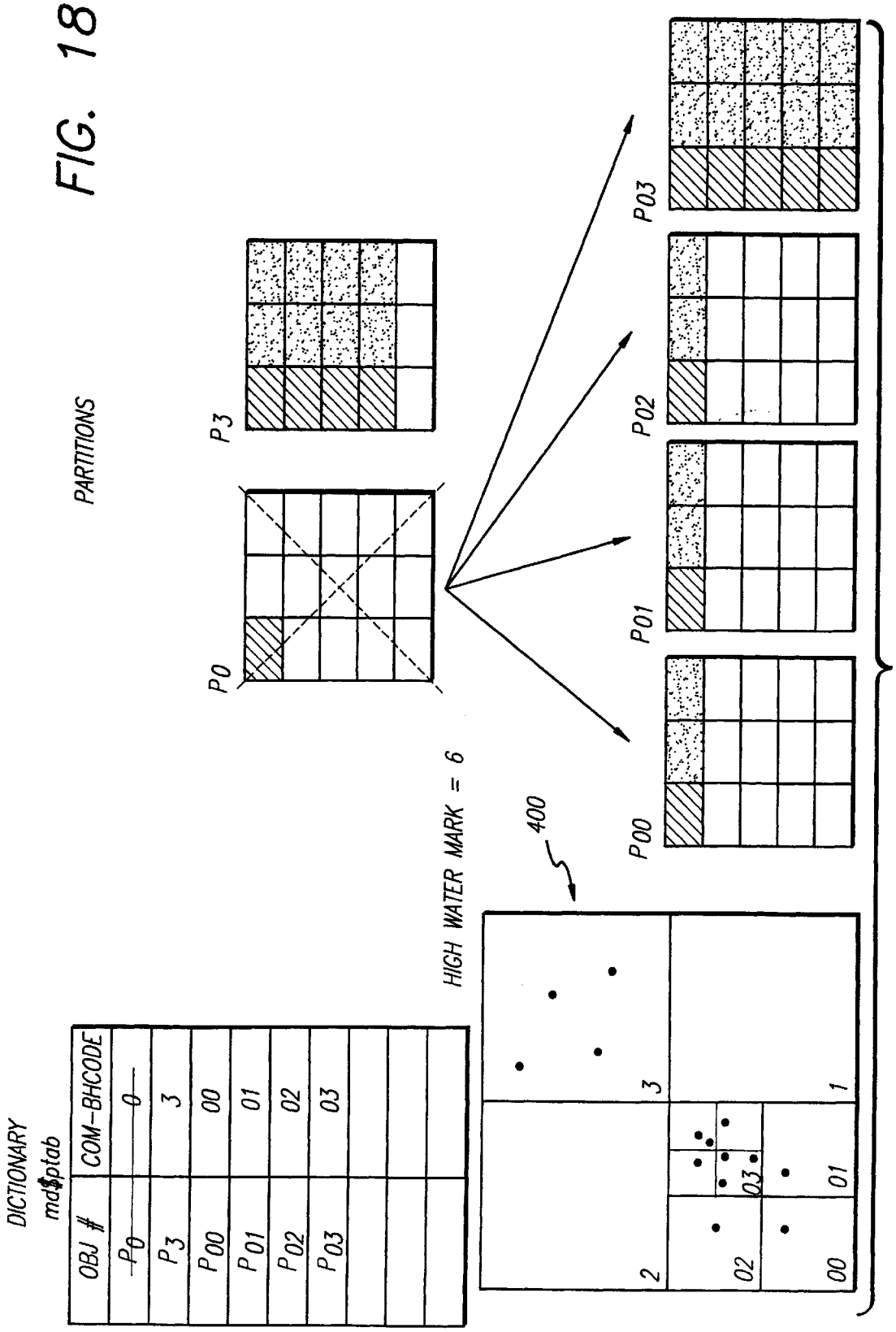
FIG. 18 conceptually illustrates the present invention's data dictionary used in conjunction with automatic data table partitioning.

Referring now to FIG. 18, as illustrated, an exemplary partition table (referred herein as "md$ptab") may conceptually be considered as including two columns, namely OBJ# and COM_BH CODE. It will be appreciated that in the actual implementation of the present invention, the md$ptab table includes numerous columns. COM_ represents the extent of a partition, in other words, how much area of a region the partition covers. The universe of data may be conceptualized as an area 400 shown in FIG. 18. As previously described with reference to the BH code data structure and data partitioning scheme, the region 400 is recursively decomposed into quadrants (in two dimensions). The recursive decomposition into quadrants is driven by the high water mark (which in FIG. 18 is set to six) and the density of spatial collected data. Thus, each of the partitions which have been decomposed in accordance with the present invention represents an object in the data dictionary. Each of the object numbers illustrated in the table md$ptab is a record in the multidimension table 304. It will be appreciated that the data dictionary's organization and the present invention's automatic data partitioning scheme are interrelated, wherein each table represents an object with a corresponding COM_BH CODE.

Figure 19:
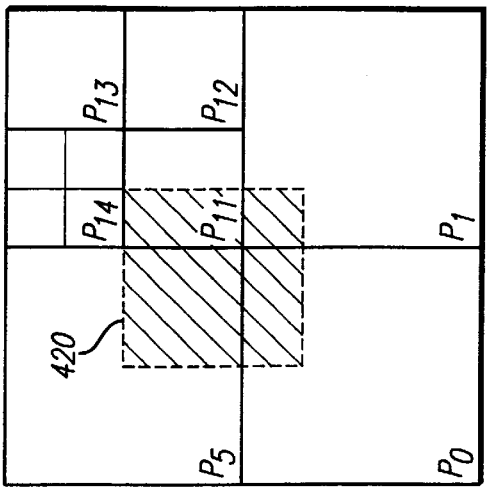
FIG. 19 illustrates the operation of the present invention for data access.

Referring now to FIG. 19, a further example of the present invention's data dictionary and table partitioning will be described whereby the present invention identifies data which overlaps a region defined by a user. As illustrated, a universe of data 410 has been recursively decomposed in accordance with the teachings of the present invention. Through the process of recursive decomposition, areas and corresponding partitions $P_0$, $P_1$, $P_5$, $P_{11}$, $P_{12}$, $P_{13}$, and $P_{14}$ have been created. The md$ptab table 415 includes a list of objects with corresponding common BH CODE (COM_BH CODE) for each of the partitions. The COM_BH CODE represents the extent of that partition, in other words, the extent of the area which the partition covers. A user may query the present invention to request: "select all data", where the data resides in some user defined region of the data universe. As illustrated in the figure, the present invention identifies each of the tables (OBJ#) in which at least a portion of the requested region resides (identified schematically as a dashed region 420). The present invention then generates a list of the partitions (OBJ#) which include at least a portion of the region 420. In the example shown, this list includes $P_5$, $P_{11}$, $P_0$ and $P_1$.

Once the object list has been identified, the user's query is answered by identifying the data requested from the first partition that the present invention has identified ($P_5$). The function BHWINDOW is a built-in internal function which determines if a data point which is the subject of a search is disposed within a currently identified window. Thus, the original user's query is expanded into one or more subqueries that are then joined together by a relational operator UNION ALL. UNION ALL is an operation in the database which takes all of the rows from the first query, and adds them together with the rows from the second query, and continues this operation for each of the identified partitions. A second query is to select the location and depth from the second partition identified in the example as partition $P_{11}$. Similarly, the present invention queries each of the partitions identified as being disposed within the user defined region 420. The results of each of these queries are then presented to the user.

It will be appreciated that the present invention's methodology for data access provides enhanced efficiency in that the other partitions (e.g., $P_{13}$ and $P_{12}$) which do not participate in the query are discarded. Efficiency is gained from discarding what is not needed and only looking at what is required. The present invention discards $P_{13}$ and $P_{12}$ and the other three unlabeled partitions that since they are not part of the query. The window only covers $P_5$, $P_{11}$, $P_0$ and $P_1$. Those are the only partitions which are examined to resolve the query.

To summarize the above referenced description, the process of resolving any spatial query is a two step process. The first step is to identify the partitions overlapping a user defined window. As shown in the example of FIG. 19, those partitions are $P_5$, $P_{11}$, $P_0$ and $P_1$. Examining the window (which is defined by the cross-hatch) and determining which partitions overlap. This is done mathematically in that the present invention selects every partition which is in md$ptab and begins at $P_0$ in the table. If $P_0$ is in the window, it is selected. Then it continues to $P_1$ and computes a geometric calculation. Does it overlap the window? In the present example, it does and thus $P_1$ is selected. The same pattern follows for $P_5$ through $P_{13}$. As can be seen, $P_{12}$, $P_{13}$, $P_{14}$ are outside of the window of interest and are rejected, as are the other unlabeled partitions in the figure. The next step is to identify all records within selected partitions that identically overlap a user defined window.

Loading and Access of Two Dimensional Lines

Mathematically, a line is comprised of two end points, including a first point ($X_1$, $Y_1$) and a second point ($X_2$, $Y_2$)

joined by a line segment (see FIG. 20(a)). In accordance with the teachings of the present invention, a line segment is represented as a four dimensional BH CODE. The value of each of the four points $X_1$, $Y_1$, $X_2$, $Y_2$ are represented as a four dimensional BH CODE, where dimension 1 (DIM1) is equal to $X_1$, dimension 2 (DIM2) is comprised of $Y_1$, dimension 3 (DIM3) corresponds to $X_2$, and dimension 4 (DIM4) is comprised of $Y_2$ (see FIG. 20(b)). Thus, a four dimensional entity in the present invention's spatial database represents a two dimensional line segment. The loading of line segment data into the database of the present invention is analogous to the operation previously described with reference to the loading of points. The present invention's data dictionary maintains information about partitions that are used to store lines. The lines are loaded into those partitions, and as is the case with points, when the high water mark (which is the maximum data volume allowed in a partition) is overflowed, the present invention subdivides the partition just as is described for points. The difference is that when subdividing a two dimensional point partition, the present invention subdivides into four partitions, however, since a line is represented by a four dimensional object, up to sixteen ($2^4$) partitions may be created for lines at every subdivision. The present invention creates these partitions only for those partitions in which data will be stored. The unused partitions do not waste memory space and disk storage, and are only inferred from the data maintained in the md$ptab table within the data dictionary.

For the access of line data, the present invention's application to two dimensional lines is analogous to the access of point data. The present invention identifies a region that the user is interested in, and identifies the partitions. If there is a region which has lines crossing it, it is straightforward to identify the lines which have an end point within the region, or have both end points within the region. However, it is more difficult to identify a line where both end points are outside of the region. This "pass through" case presents unique problems for the access of line data. As will be described, the present invention includes a method of identifying the correct partitions for lines and takes into account the pass through case. As in the case of lines, a dictionary is provided for objects (OBJ#) and a corresponding COM_BH CODE. Each of the partitions store lines of different types. Since the lines may exist between partitions, outside of partitions, and potentially pass through partitions, the first step in the process is to identify the partitions. However, the manner in which partitions are identified differs between points and lines. Once the partitions have been identified, however, the process continues as it does with points. The present invention generates SQL statements that are then unioned together to return the resultant data set.

Referring to FIGS. 21(a) and 21(b), a line 500 is represented by a four dimensional object $X_1$, $Y_1$, $X_2$, $Y_2$. Planes $P_1$ (502) and $P_2$ (504) are defined in which each of the end points reside. As illustrated, a first level of recursive decomposition of planes $P_1$ and $P_2$ defines four equal sized quadrants in each of the respective planes. An end point in the $P_1$ plane may be placed anywhere in the plane. For purposes of description, assume that the point $X_1$, $Y_1$ is disposed in a quadrant 505 of plane $P_1$. Similarly, the end point $X_2$, $Y_2$ may reside in any of the four quadrants of plane $P_2$ (504). In the simplest case, the end point $X_2$, $Y_2$ may reside in a quadrant 510, thereby joining the two endpoints by a line segment. However, since the two planes $P_1$ and $P_2$ are identical, the end point of the line segment 500 may be disposed in any one of the four quadrants into which plane $P_2$ has been decomposed. Thus, it will be appreciated that assuming that the initial endpoint $(X_1, Y_1)$ is disposed in quadrant 505 of plane $P_1$, that the opposing endpoint defining the line segment 500 may be disposed in quadrants 510, 515, 520 or 525. Similarly, if the initial endpoint $(X_1, Y_1)$ is disposed in quadrant 530, the endpoint may be disposed in any one of the four quadrants defined in plane $P_2$.

In accordance with the teachings of the present invention, an initial step is to identify all of the potential partition shapes which may be defined by the endpoints of the line segment 500. It will be appreciated (although not fully shown in FIG. 22(a) in order not to obscure the description unnecessarily) that there are sixteen possible combinations of the end points defining line segment 500 between the planes $P_1$ (502) and $P_2$ (504). This is the case since an end point may begin in any of the quadrants of $P_1$, and have a corresponding end point in any one of the quadrants of $P_2$. As will be described, there are sixteen potential partition shapes which may be defined by a line segment having end points disposed in planes $P_1$ and $P_2$, respectively. The first of the possible partition shape is the case where an end point $(X_1, Y_1)$ is disposed in, for example, quadrant 505 with a corresponding end point disposed in quadrant 510. A two dimensional representation of these four partition shapes appears in FIG. 22(b) and is identified generally by the numeral 600.

Similarly, the sixteen possible combinations of end point to end point locations between planes $P_1$ and $P_2$ results in sixteen corresponding partition shapes. Additional shapes include vertical rectangles identified collectively by the numeral 604 which corresponds to an end point beginning in, for example, quadrant 505 of plane $P_1$ and ending in quadrant 520 of $P_2$. Similarly, partitions identified collectively by the numeral 608 correspond to an endpoint $(X_1, Y_1)$ in, for example, quadrant 505, and having an end point in quadrant 515 of plane $P_2$, along with the corresponding combinations. A final set of shapes include diagonals identified generally by the numerals 610 in FIG. 22(b). These partitions are created by an end point disposed in, for example, quadrant 506 of plane $P_1$ and having an end point in quadrant 515 of $P_2$ and the corresponding combinations therewith.

Thus, by fusing the planes together and analyzing the partition shapes created in two dimensions, sixteen partition shapes are created. The sixteen partition shapes illustrated in FIG. 22(b) represent all of the possible partition shapes which may be created using line segments extending between the planes of $P_1$ and $P_2$.

Figure 22A:
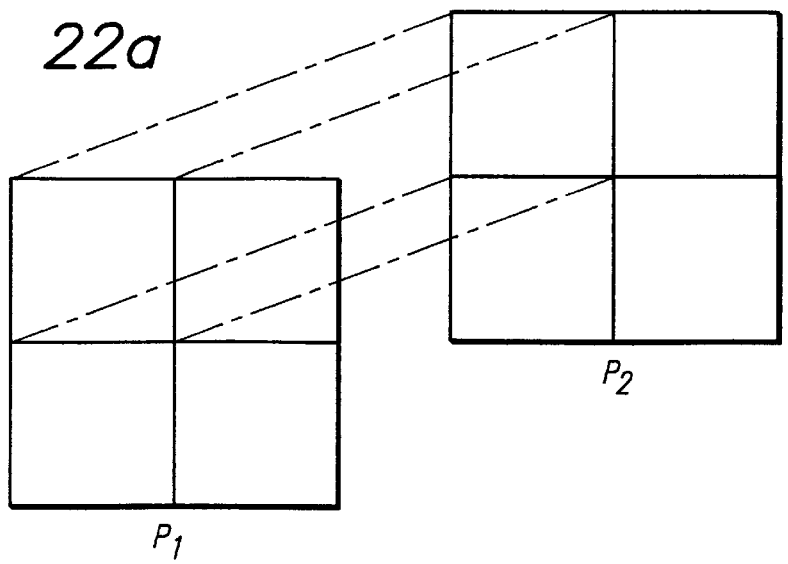
FIGS. 22(a), 22(b) and 22(c) illustrate the sixteen partition shapes utilized by the present invention for data access and loading of line segments.
Figure 22B:
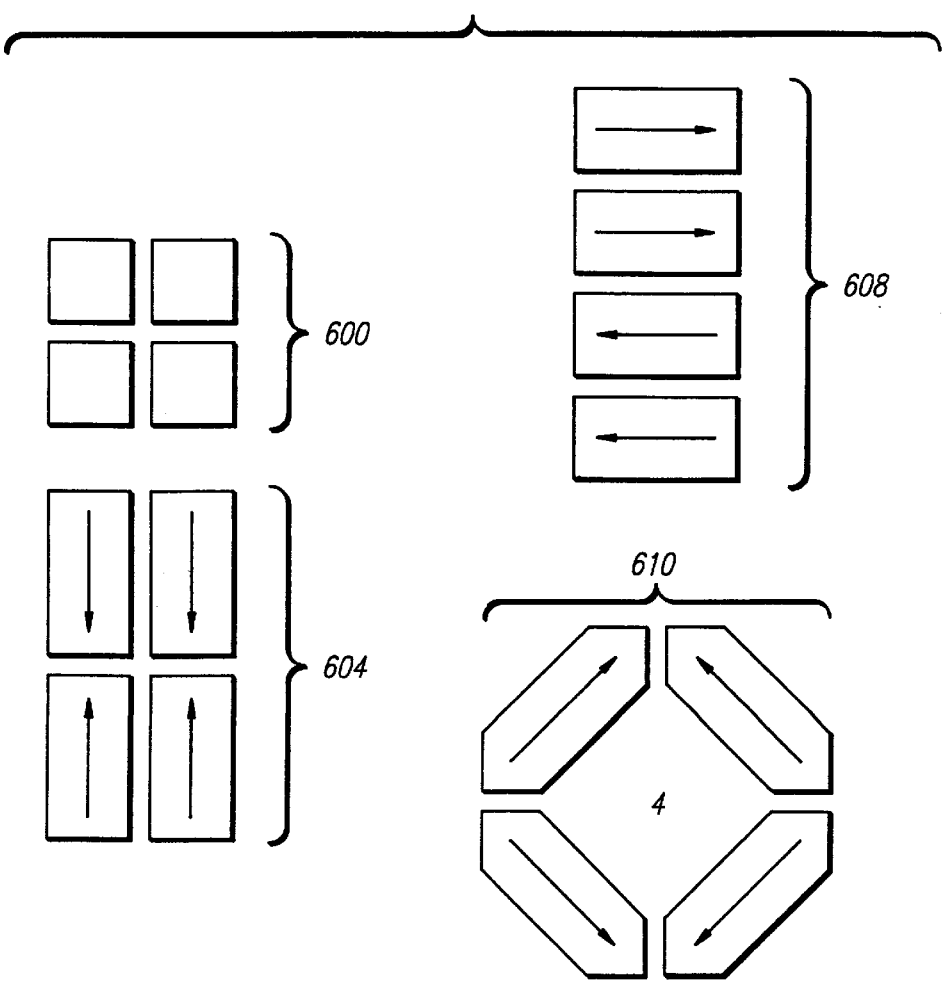
Figure 22C:
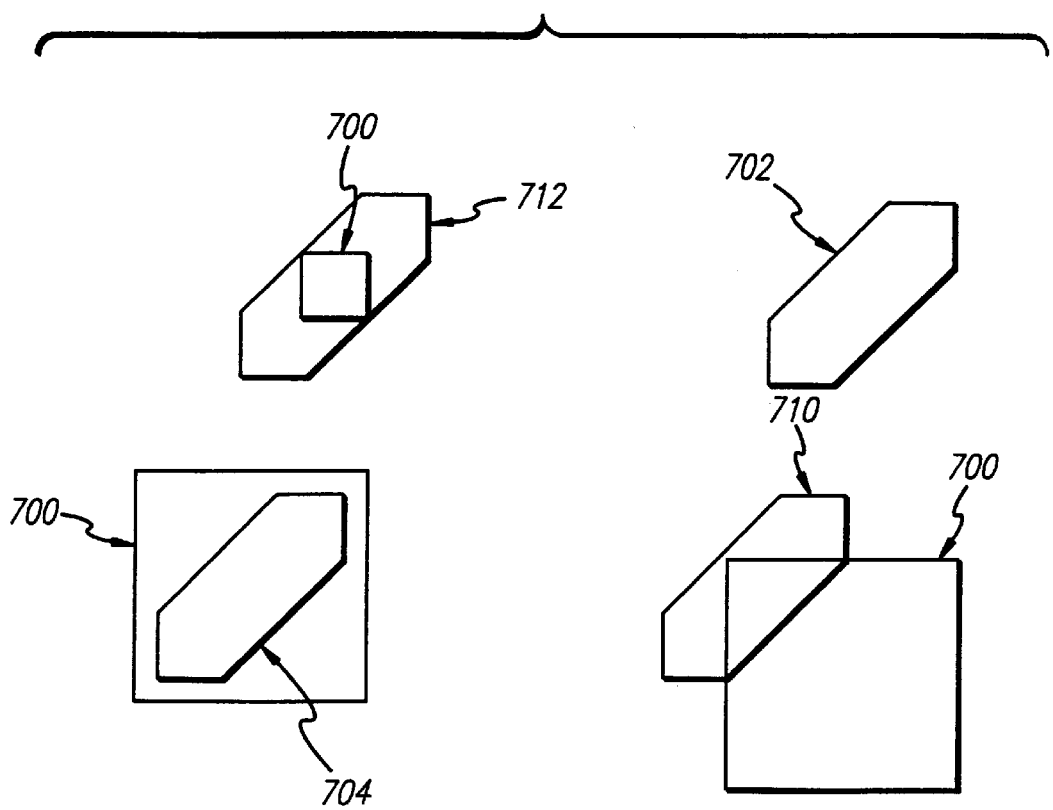

The sixteen partition shapes illustrated in FIGS. 22(a), 22(b) and 22(c) represent the partitions in the data dictionary of the present invention. By examining the records in the line segment data dictionary and decoding it such that it is in a graphics form, one of the sixteen partition shapes is created. In the present embodiment, one data dictionary is used for all spatial columns, including points and lines.

According to the method of the present invention, the first step in accessing line data stored in the data base is to first identify the partition shape which the line corresponds to. This must be one of the sixteen partition shapes illustrated in FIG. 22(b). The next step is to extract all of the partition records from the dictionary that belong to the table that data is extracted from. Next, a list is compiled of these partitions which are those four dimensional BH codes and the present invention decodes that BH code. Upon decoding the BH code, one of the sixteen partition shapes will be derived. Once the partition is identified, the partition is then overlapped onto the user defined region, to determine whether or not the partitioned area overlaps the region.

For ease of understanding, in FIG. 22(c) there is shown a rectangular area identified by the numeral 700 which corresponds to the user defined area of interest. Assume for sake of example, that a partition shape 702 has been derived from BH code data. If it is determined that the partition shape 702 is disjoined with the region of interest 700, then it is simply discarded since the partition does not reside in any portion of the area of interest 700. The next entry in the data dictionary list is decoded and the partition is extracted. An overlap function is performed, and one or more conditions will result. Either the regions will be disjoint, or the partition will be fully enclosed within the region (see partition 704 as being disposed within the region 700). Alternatively, the regions such as partition 710 and region 700 may partially overlap and thereby intersect. In the example illustrated in FIG. 22(c), partition 704 and partition 710 will be stored for processing, and partition 702 will be discarded. Similarly, in the example shown in FIG. 22(c) where the partition 712 fully engulfs the area 700, partition 712 will be stored for processing.

In summary, the present invention examined the partition list, determined which of the partitions are defined, decoded the partition shapes, found which of the shapes overlapped the user defined region, and compiled a list of partitions that may have records that are within the region. The next step is that from the list of compiled partitions, the present invention reads each record in each partition that it has identified, determines if that record is in the region. If it is, the present invention returns the record to the user as a record that is within the region as defined. If the record is not in the region, it is discarded.

Application of the Present Invention to Topology

Spatial data management requires more than the management of points and lines. Spatial data management also requires the management of more complex spatial objects. For example, a data set representing a road passing through a park is comprised of complex objects composed of primitive elements. The road is comprised of line segments and the park is comprised of line segments and/or region data. The objective of the present invention is to provide a data structure to efficiently maintain a complex object, and therefore maintain its topology. Topology of an object must be maintained to determine the relationship among the various objects.

Figure 23:
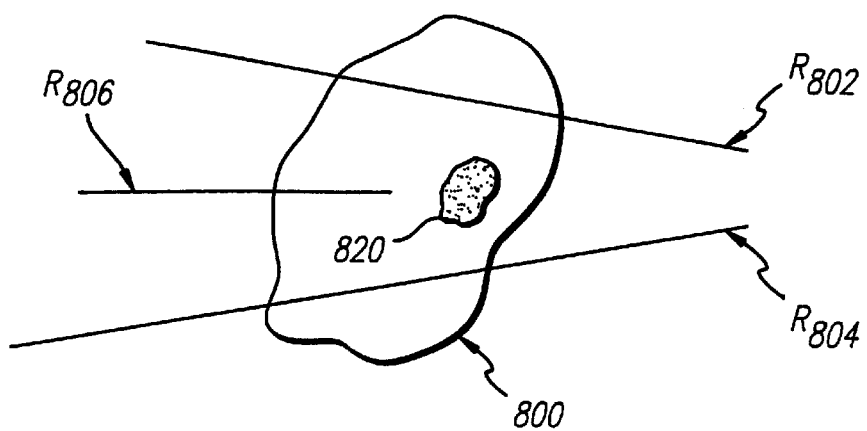

Referring now to FIG. 23, a park is conceptually illustrated and referred to by the numeral 800. Roads $R_{802}$, $R_{804}$ and $R_{806}$ pass through or otherwise intersect the park 800. A lake 820 is defined as a region fully disposed within the park 800. Important information includes the relationship of the roads to the park, and which roads penetrate the park and which roads cross the park. The present invention applies its unique data structure of binary BH code to a spatial theory developed by Max Egenhofer and disclosed in a paper entitled "Toward Formal Definitions of Topological Relations Among Spatial Objects" (Univ. of Maine). A copy of this paper has been submitted concurrent with the filing of the patent application on which this patent is based.

Utilizing the Egenhofer methodology, the present invention implements a process referred to as a four intersection methodology.

Figures 24, 25:
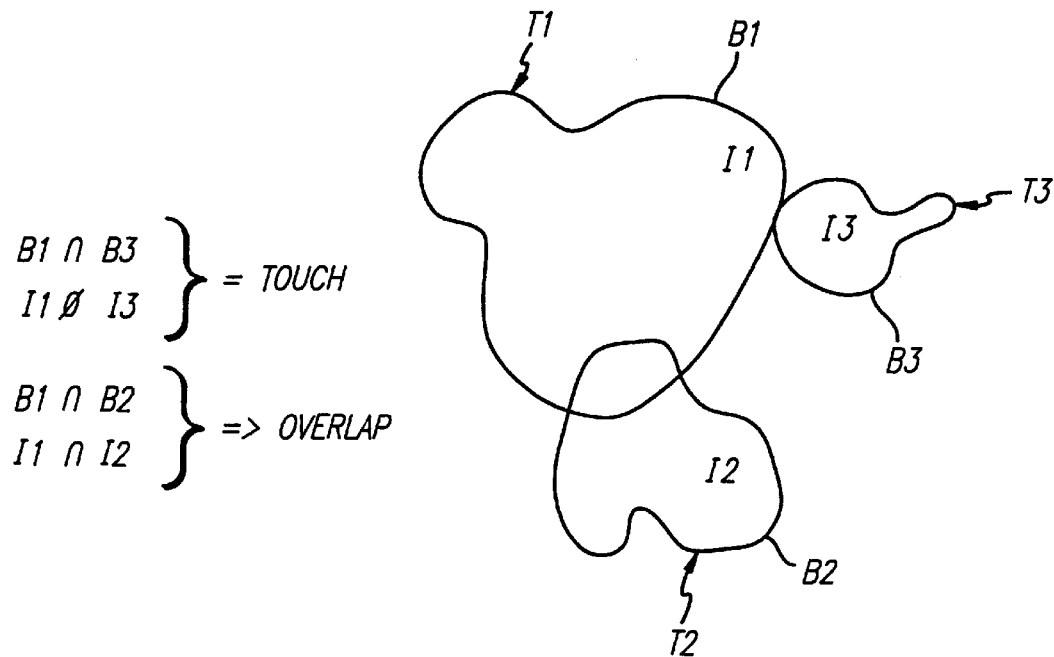
FIG. 24 conceptually illustrates the intersection of interiors and boundaries of objects.
FIG. 25 illustrates a table of the present invention's use of a four intersection method for the implementation of topological relationship operations.

Referring to FIG. 24, a topology T1 may be defined by its interiors (I1) and boundaries (B1). Similarly, a second topology T2 may be defined by its interiors (I2) and boundaries (B2). To determine whether or not the topology T1 and T2 overlap, a determination is made as to whether or not the boundaries (B1 and B2) intersect, and a similar operation is conducted to determine whether the interior I1 and I2 intersect. If an additional topology T3 is added, which is defined by its interiors (I3) and boundaries (B3), a determination may be made as to whether or not topology T3 touches topology T1. Determining whether topology T1 and T3 touch results in an intersection between the boundaries of B1 and B3, but no intersection between the interiors of I1 and I3, as illustrated in FIG. 24.

Referring now to FIG. 25, a table of a four intersection relationship is illustrated. Assume for sake of example, that two objects A and B exist, where $I_A$ is the interior of A and $I_B$ represents the interior of B. Similarly, the boundaries of A are represented by $B_A$, and the boundaries of B are represented by $B_B$. As illustrated, four columns may define the relationship between the two objects A and B. The first relationship is the case where the interior of A ($I_A$) intersects with the interior of B ($I_B$). The second column of the table in FIG. 25 illustrates the case where the boundaries of region A ($B_A$) intersect with the boundaries of region B ($B_B$) Moreover, as illustrated in the Figure, the interior of A ($I_A$) may intersect with the boundary of object B ($B_B$). Finally, the interior of object B ($I_B$) may intersect with the boundary of A ($B_A$). The results of these intersections defines the relationships between objects A and B. Objects A and B may be disjoint, they may overlap, or they may touch. In the convention of this Specification, a 0 in the table illustrated in FIG. 25 indicates that the condition is not true and a 1 indicates that a condition is true. For example, as shown for the touch relationship, the only true case in the example is that where the boundaries of A ($B_A$) intersect with the boundaries of B ($B_B$).

In summary, four intersections relationship table is used to answer two types of topological queries. The first one is when there are two objects and the user wishes to know the relationship between them. The example is when the user has two objects (e.g., T1 and T2), and desires to know what is the relationship between these two objects. The second topological query is when the user has an object and wishes to find other objects that fulfill a certain relationship with this object, for example, T3 and T1.

Referring now to FIG. 26(a), the present invention utilizes the Egenhofer four point intersection techniques to handle topology operations. As shown in FIG. 26(a), an object $T_4$ is defined by an interior $I_4$ and a boundary $B_4$. The object $T_4$ is recursively decomposed through a process referred to as "tiling" to break the object down into regions which are represented by BH codes. It is contemplated that the process of tiling an object to enter it into the database of the present invention is an automated process invisible to a user. Each tile is represented by a BH code in the database of the present invention. It will be appreciated by one skilled in the art, that the level of tiling required to decompose an object into its respective BH codes is a function of the resolution required. For example, areas which represent interior regions may be defined by BH codes representing relatively large tiles. Those regions near the boundary (B4) require higher resolution with a corresponding greater degree of tiling to define the boundaries using BH code.

Referring now to FIG. 15 in conjunction with FIG. 26(b), the BH code data structure of the present invention includes a topology bit 202. Utilizing the teachings of the present invention, a BH code which is representative of an interior region is defined as having a topology bit set equal to a logical "1". For BH codes identifying boundary regions, the topology bit 202 is set equal to a logical "0". It will be appreciated, that any one of a number of logical states may be used to represent interior and boundary regions, and that the convention adopted in this Specification is only exemplary of one of many conventions available.

As shown in FIG. 26(b), an object partitioned table for the object $T_4$ is created using the teachings of the present invention previously discussed with reference to data partitioning. As illustrated in FIG. 26(b), the topology for each object (for example, $T_4$) is represented by a unique partitioned table wherein the BH code identifies whether or not a particular region forms part of an interior or boundary of the object. Other objects (for example in FIG. 24 $T_1$, $T_2$ and $T_3$) are tiled and corresponding partitioned tables for each of the objects are generated. Similarly, line segments may also be represented using partitioned tables rather than representing line segments using four dimensional BH codes as previously described in this Specification. Accordingly, using the teachings of the present invention, any multidimensional object may be "tiled" and decomposed into regions represented by BH code and partitioned tables.

Once objects have been tiled and partitioned tables created having BH codes corresponding to either interior or boundary regions, the operations illustrated in FIG. 25 may be performed on the BH codes disposed within each of the respective partitioned tables. The operations of disjoint, overlap and touch may be performed on the BH code entries comprising the partitioned tables. Similarly, the kernel functions illustrated in FIG. 15 may also be applied to the BH code comprising the partitioned tables for the various objects.

Utilizing the teachings of the present invention, it will be appreciated that the boundaries of objects may also represent additional dimensions including depth or time. Moreover, in the case of diffuse boundaries, additional dimensions may be used to define gradients. An example where boundaries may be diffuse, and represented by an additional BH code dimension, is the case where gaseous nebula is diffused into surrounding space, or a subterranean aquifer is diffused through a boundary region of sand and rocks. The use of BH code to define topological relationships provides unique advantages over prior art systems which represented boundaries utilizing line segments to define boundaries. The present invention's point-set topology using BH code extends beyond two dimensions and represents a fundamental advance in the art.

SUMMARY

As described, the present invention provides an improved method and apparatus for storing, manipulating, and retrieving spatial and non-spatial data in a single architecture based on the current relational data model. The present invention's unique binary BH code, in conjunction with automatic data partitioning and the use of data dictionaries permits large volumes of spatial data to be loaded and accessed quickly. The present invention's implementation and utilization of a binary BH code overcomes the inherent limitations of prior art relational database systems. In addition, as described, the present invention seamlessly handles both spatial and non-spatial data in the same database without the requirement of creating spatial indexes between relational database and spatial database engines. As such, the present invention constitutes a fundamental improvement in the field of database structures over methods and apparatus known in the prior art.

While the present invention has been described in conjunction with certain examples to illustrate the preferred embodiment, and with reference to FIGS. 1 through 26, it will be appreciated by one skilled in the art that a variety of alternatives, modifications, and variations of the present invention are possible for any particular application of the present invention.

We claim:

1. A method for storing dimensional data in a database, comprising the computer-implemented steps of:
   receiving dimensional data points;
   determining a hyperspatial code for said data points by recursively defining spatial cells in which a predefined volume of said dimensional data points reside, said spatial cells being identified by binary quantities representing the location of said spatial cells relative to one another;
   generating hyperspatial code data partitions based on the number of dimensions of said dimensional data points and said predefined volume; and
   generating a data dictionary, said data dictionary including a table having respective entries for each of said generated data partitions.

2. The method for storing dimensional data as defined by claim 1, wherein each of said data partitions stored in said data dictionary is a database object.

3. A method for storing dimensional data in a database, comprising the computer-implemented steps of:
   receiving dimensional data points; and
   determining binary hyperspatial codes (BH codes) for said data points, respectively, by recursively defining spatial cells in which said dimensional data points reside, said spatial cells being identified by binary quantities representing the location of said spatial cells relative to one another, wherein each of said BH codes includes a data structure having BH code data representing a hyperspatial key and meta data representing an attribute of the BH code.

4. The method for storing dimensional data as defined by claim 3, wherein said meta data includes dimension bits to identify a number of dimensions in hyperspatial key.

5. The method for storing dimensional data as defined by claim 3, wherein said meta data includes a type bit to identify the type of a geometric object associated with the hyperspatial key.

6. The method for storing dimensional data as defined by claim 3, wherein said meta data includes a topology bit to identify whether hyperspatial key represents the interior or boundary of topology.

7. The method for storing dimensional data as defined by claim 3, wherein said meta data includes level bits to identify the number of levels of precision which are encoded in hyperspatial key for each dimension identified by said dimension bits.

8. A method for storing dimensional data in a database, comprising the computer-implemented steps of:
   receiving dimensional data points;
   determining a hyperspatial code for said data points by recursively defining spatial cells in which said dimensional data points reside, said spatial cells being identified by binary quantities representing the location of said spatial cells relative to one another; and
   generating a data dictionary, wherein said data dictionary includes a list of all tables stored in said database that are multidimensional.

9. The method for storing dimensional data as defined by claim 8, wherein said database stores a list of said dimensional data, including both spatial and non-spatial.

10. The method for storing dimensional data as defined by claim 8 wherein said data dictionary includes partitioned tables and non-partitioned tables, said non-partitioned tables comprising relational database tables that include at least one column having attributes with spatial hyperspatial code columns.

11. The method for storing dimensional data as defined by claim 10, wherein said partitioned tables comprise multidimensional tables that include at least one spatial column and are partitioned on said at least one of said spatial columns.

12. An apparatus for storing dimensional data points in a database coupled to a computer, comprising:

an element coupled to said computer for determining a hyperspatial code for said dimensional data points by recursively decomposing spatial cells in which a predefined volume of said dimensional data points reside, said spatial cells being identified by binary quantities representing the location of said spatial cells relative to one another;

an element for partitioning and storing said hyperspatial code in said database, said element for partitioning generates hyperspatial code data partitions based on the number of dimensions of said dimensional data points and said predefined volume; and an element for generating a data dictionary, said data dictionary including a partition table having respective entries for each of said generated data partitions.

13. The apparatus as defined by claim 12, wherein each of said data partitions stored in said data dictionary is a database object.

14. An apparatus for storing dimensional data points in a database coupled to a computer, comprising:

an element coupled to said computer for determining binary hyperspatial codes (BH codes) for said data points, respectively, by recursively defining spatial cells in which said dimensional data points reside, said spatial cells being identified by binary quantities representing the location of said spatial cells relative to one another, wherein each of said BH codes includes a data structure having BH code data representing a hyperspatial key and meta data representing an attribute of the BH code; and an element for partitioning and storing said BH codes in said database.

15. The apparatus as defined by claim 14, wherein said meta data includes dimension bits to identify a number of dimensions in the hyperspatial key.

16. The apparatus as defined by claim 14, wherein said meta data includes a type bit to identify the type of a geometric object associated with the hyperspatial key.

17. The apparatus as defined by claim 14, wherein said meta data includes a topology bit to identify whether hyperspatial key represents the interior or boundary of topology.

18. The apparatus as defined by claim 14, wherein said meta data includes level bits to identify the number of levels of precision which are encoded in hyperspatial key for each dimension identified by said dimension bits.

19. An apparatus for storing dimensional data points in a database coupled to a computer, comprising:

an element coupled to said computer for determining a hyperspatial code for said dimensional data points by recursively decomposing spatial cells in said dimensional data points reside, said spatial cells being identified by binary quantities representing the location of said spatial cells relative to one another;

an element for partitioning and storing said hyperspatial code in said database; and an element for generating a data dictionary, wherein said data dictionary includes a multidimension table which contains a list of all tables stored in said database that are multidimensional.

20. The apparatus as defined by claim 19, wherein said database stores a list of said dimensional data, including both spatial and non-spatial.

21. The apparatus as defined by claim 19, wherein said data dictionary includes partitioned tables and non-partitioned tables, said non-partitioned tables comprising relational database tables that include at least one column having attributes with spatial hyperspatial code columns.

22. The apparatus as defined by claim 21, wherein said partitioned tables comprise multidimensional tables that include at least one spatial column and are partitioned on said at least one of said spatial columns.

23. A method for storing a line segment in a database, comprising the computer-implemented steps of:

receiving data points representing a first $(x_1,y_1)$ and a second $(x_2, y_2)$ end point of said line segment; and determining a single hyperspatial code for said line segment by defining first and second spatial cells in which said first and second end points reside, respectively, said first and second spatial cells being identified by binary quantities representing the location of said first and second spatial cells relative to one another.

24. The method as defined by claim 23, wherein said hyperspatial code determined for said line segment is a four dimension hyperspatial code.

25. The method as defined by claim 24, wherein:

a first dimension of the four dimension hyperspatial code represents $x_1$, a second dimension of the four dimension hyperspatial code represents $y_1$, a third dimension of the four dimension hyperspatial code represents $x_2$ and a fourth dimension of the four dimension hyperspatial code represents $y_2$.

26. The method as defined by claim 23, wherein a plurality of line segments are stored in said database, each of said line segments being represented by a hyperspatial code.

27. The method as defined by claim 23, further providing an element for performing the steps of generating hyperspatial code data partitions based upon a predefined number of hyperspatial code entries which may be disposed in any one partition.

28. The method as defined by claim 27, wherein if during said generation of hyperspatial code data partitions said predefined number of hyperspatial code entries is exceeded, additional child data partitions are generated and said original parent data partition is not retained.

29. The method as defined by claim 28, wherein for each of said parent data partitions in which said predefined number of hyperspatial code entries are exceeded, sixteen child data partitions are created.

30. The method as defined by claim 29, wherein of said sixteen data partitions only those partitions in which a hyperspatial code is actually stored are maintained in said database.

31. The method as defined by claim 27, wherein attribute data is associated with said hyperspatial codes representing said dimensional data, said attribute data further being associated with said BH code data partitions.

32. The method as defined by claim 27, further including an element for performing the steps of generating a data dictionary, said data dictionary including a table having respective entries for each of said generated data partitions.

33. The method as defined by claim 32, wherein each of said data partitions stored in said data dictionary is a database objects.

34. The method as defined by claim 26, wherein each said hyperspatial code is a binary hyperspatial code (BH code) including a data structure having hyperspatial code data representing a hyperspatial key and meta data representing an attribute of the BH code.

35. The method as defined by claim 34, wherein said meta data includes a type bit to identify the type of said hyperspatial code data as a geometric object.

36. The method as defined by claim 32, wherein said data dictionary includes a list of all tables stored in said database that are multidimensional.

37. The method as defined by claim 32, further including a method for accessing said stored line segments, comprising the steps of:

receiving input from a user defining a region of interest;

identifying which of said data partitions define line segments which are at least partially disposed within said region of interest;

compiling a list of said identified data partitions;

determining if each of said hyperspatial code entries in said identified partitions are disposed within said region of interest, and reporting those hyperspatial code entries which are disposed within said region to said user.

38. The method as defined by claim 37, wherein said step of identifying which of said data partitions define line segments which are at least partially disposed within said region of interest includes the steps of:

defining sixteen potential partition shapes for said stored line segments, said sixteen partition shapes representing said data partitions in said data dictionary; and examining each of said hyperspatial code entries in said partitions stored in said data dictionary and decoding said hyperspatial code.

39. An apparatus for storing a line segment in a database coupled to a computer, comprising:

an element for receiving data points representing a first $(x_1,y_1)$ and a second $(x_2,y_2)$ end point of said line segment;

an element for determining a single hyperspatial code for said line segment by defining first and second spatial cells in which said first and second end points reside, respectively, said first and second spatial cells being identified by binary quantities representing the location of said first and second spatial cells relative to one another.

40. The apparatus as defined by claim 39, wherein said hyperspatial code determined for said line segment is a four dimension hyperspatial code.

41. The apparatus as defined by claim 40, wherein:

a first dimension of the four dimension hyperspatial code represents $x_1$, a second dimension of the four dimension hyperspatial code represents $y_1$, a third dimension of the four dimension hyperspatial code represents $x_2$ and a fourth dimension of the four dimension hyperspatial code represents $y_2$.

42. The apparatus as defined by claim 39, wherein a plurality of line segments are stored in said database, each of said line segments being represented by a hyperspatial code.

43. The apparatus as defined by claim 39, further providing an element for generating hyperspatial code data partitions based upon a predefined number of hyperspatial code entries which may be disposed in any one partition.

44. The apparatus as defined by claim 43, wherein if during said generation of hyperspatial code data partitions said predefined number of hyperspatial code entries is exceeded, additional child data partitions are generated and said original parent data partition is not retained.

45. The apparatus as defined by claim 44, wherein for each of said parent data partitions in which said predefined number of hyperspatial code entries are exceeded, sixteen child data partitions are treated.

46. The apparatus as defined by claim 45, wherein of said sixteen data partitions only those partitions in which hyperspatial code is actually stored are maintained in said database.

47. The apparatus as defined by claim 43, wherein attribute data is associated with said hyperspatial codes representing said dimensional data, said attribute data further being associated with said hyperspatial code data partitions.

48. The apparatus as defined by claim 43, further including an element for generating a data dictionary, said data dictionary including a table having respective entries for each of said generated data partitions.

49. The apparatus as defined by claim 48, wherein each of said data partitions stored in said data dictionary is a database object.

50. The apparatus as defined by claim 42, wherein each said hyperspatial code is a binary hyperspatial code (BH code) including a data structure having BH code data representing a hyperspatial key and meta data representing an attribute of the BH code.

51. The apparatus as defined by claim 50, wherein said meta data includes a type bit to identify the type of hyperspatial key as a geometric object.

52. The apparatus as defined by claim 48, wherein said data dictionary includes a list of all tables stored in a corresponding relational database which are multidimensional.

53. The apparatus as defined by claim 43, further including an apparatus for accessing said stored line segments, comprising:

an element for receiving input from a user to define a region of interest;

an element for identifying which of said data partitions define line segments which are at least partially disposed within said region of interest;

an element for compiling a list of said identified data partitions;

an element for determining if each of said hyperspatial code entries in said identified partitions are disposed within said region of interest, and reporting those hyperspatial code entries which are disposed within said region to said user.

54. A method for storing a topologic representation of a first object in a database, comprising the computer-implemented steps of:

defining an interior $I_1$ and a boundary $B_1$ for said first object;

recursively decomposing said first object into first object tile regions defined by BH codes; and wherein said BH codes identify whether each of said first tile regions forms part of said interior $I_1$ or said boundary $B_1$.

55. The method as defined by claim 54, further comprising the step of creating an object partitioned table for said first object containing said BH codes.

56. The method as defined by claim 55, further including the steps of:
providing a second object;
defining an interior $I_2$, and a boundary $B_2$ for said second object;
recursively decomposing said second object into second object tile regions defined by BH codes;
wherein each of said BH codes for said second object identifies whether each of said second object tile regions forms part of said interior $I_2$ or said boundary $B_2$.

57. The method as defined by claim 56, further comprising the step of creating an object partitioned table for said second object containing said BH codes for said second object.

58. The method as defined by claim 57, further including the step of applying an intersection methodology to said BH codes in said first and second object partitioned tables to determine the relationship of said first and second objects to one another.

59. The method as defined by claim 58, wherein said intersection methodology comprises an Egenhofer Four Point Intersection methodology.

60. An apparatus for storing a topologic representation of a first object in a database, comprising:
an element for defining an interior $I_1$ and a boundary $B_1$ for said first object; and
an element for recursively decomposing said first object into first object tile regions defined by binary hyperspatial codes (BH code);
wherein each of said BH codes identifies whether each of said first tile regions forms part of said interior $I_1$ or said boundary $B_1$.

61. The apparatus as defined by claim 60 further including an element for creating an object partitioned table for said first object containing said BH codes.

62. The apparatus as defined by claim 61 further including:
a second object;
an element for defining an interior $I_2$ and a boundary $B_2$ for said second object; and
an element for recursively decomposing said second object into second object tile regions defined by BH codes;
wherein each of said BH codes identifies whether each of said second tile regions forms part of said interior $I_2$ or said boundary $B_2$.

63. The apparatus as defined by claim 62, further including an element for creating an object partitioned table for said second object containing said BH codes for said second object.

64. The apparatus as defined by claim 63, further including an element for applying an intersection methodology to said BH codes in said first and second object partitioned tables to determine the relationship of said first and second objects to one another.

65. The apparatus as defined by claim 64, wherein said intersection methodology comprises an Egenhofer Four Point Intersection methodology.

66. The method as defined by claim 1, wherein each of said respective entries for each of said generated data partitions includes a hyperspatial code value representing an extent of a corresponding generated data partition.

67. The apparatus as defined by claim 12, wherein each of said respective entries for each of said generated data partitions includes a hyperspatial code value representing an extent of a corresponding generated data partition.

68. The method as defined by claim 56, wherein each of BH codes includes a data structure having code data and meta data, said meta data including a topology bit to identify whether said BH code data represents the interior or boundary of topology.

69. The apparatus as defined by claim 62, wherein each of BH codes includes a data structure having code data and meta data, said meta data including a topology bit to identify whether said BH code data represents the interior or boundary of topology.

* * * * *